United States Patent
Zhu et al.

(10) Patent No.: US 11,188,389 B2
(45) Date of Patent: Nov. 30, 2021

(54) DISTRIBUTED SYSTEM THAT PROMOTES TASK-MACHINE AFFINITY

(71) Applicant: Microsoft Technology Licensing, LLC, Redmond, WA (US)

(72) Inventors: Jia Zhu, Bellevue, WA (US); Simon Julian Powers, Seattle, WA (US); Paolo Codato, Bellevue, WA (US); Yi Zou, Bellevue, WA (US); Junaid Ahmed, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 253 days.

(21) Appl. No.: 16/460,119

(22) Filed: Jul. 2, 2019

(65) Prior Publication Data
US 2021/0004266 A1    Jan. 7, 2021

(51) Int. Cl.
*G06F 9/46* (2006.01)
*G06F 9/50* (2006.01)
*G06F 16/953* (2019.01)

(52) U.S. Cl.
CPC ............ *G06F 9/505* (2013.01); *G06F 16/953* (2019.01)

(58) Field of Classification Search
CPC ...... G06F 9/505; G06F 16/953; G06F 9/5027; G06F 9/5033
See application file for complete search history.

(56) References Cited

U.S. PATENT DOCUMENTS

| | | |
|---|---|---|
| 2009/0100441 A1 | 4/2009 | Wolman et al. |
| 2015/0181165 A1* | 6/2015 | Iltus .......................... H04N 7/15 348/14.09 |
| 2018/0052765 A1 | 2/2018 | Imbierski |

OTHER PUBLICATIONS

PCT Search and Written Opinion for PCT/US2020/033894, dated Aug. 13, 2020, 13 pages.
Hunt, et al., "ZooKeeper: Wait-free coordination for Internet-scale systems," available at <<https://www.usenix.org/legacy/event/atc10/tech/full_papers/Hunt.pdf>>, Proceedings of the 2010 USENIX Conference on USENIX Annual Technical Conference, 2010, 14 pages.
"How Kata Works," available at <<http://katta.sourceforge.net/documentation/how-katta-works>>, SourceForge, Jan. 8, 2010, 3 pages.

(Continued)

*Primary Examiner* — Adam Lee

(57) ABSTRACT

A technique is described herein for allocating tasks within a distributed system. The distributed system includes plural computing devices. Each computing device, in turn, provides a bucket manager and at least one application instance. The bucket managers allocate work to the computing devices in units of buckets, in a manner governed by a set of application-specific initialization parameters. The bucket managers also perform their assignment function in cooperation with a separate storage and notification (S&N) system. The S&N system stores data nodes in a hierarchical data structure that reflect the assignment-related state of the distributed system. The S&N system also notifies the bucket managers upon changes in the data nodes. According to one provision, the bucket managers include logic that reduces expensive context changes when computing devices join and leave the distributed system.

20 Claims, 13 Drawing Sheets

(56) References Cited

OTHER PUBLICATIONS

"Consistent hashing," available at <<https://en.wikipedia.org/wiki/Consistent_hashing>>, Wikipedia article, accessed on May 17, 2019, 4 pages.

"Gossip protocol," available at <<https://en.wikipedia.org/wiki/Gossip_protocol>>, Wikipedia article, accessed on May 17, 2019, 5 pages.

\* cited by examiner

ILLUSTRATIVE SUMMARY OF THE OPERATION OF THE BUCKET MANAGER 1702

INITIALIZE A BUCKET MANAGER BASED ON A SET OF INITIALIZATION PARAMETERS RECEIVED FROM AN APPLICATION INSTANCE INSTALLED ON THE COMPUTING DEVICE, THE BUCKET MANAGER CORRESPONDING TO A GENERAL-PURPOSE RESOURCE THAT CAN BE RECONFIGURED BY DIFFERENT SETS OF INITIALIZATION PARAMETERS TO WORK IN CONJUNCTION WITH DIFFERENT APPLICATION INSTANCES
1704

USE THE BUCKET MANAGER TO INTERACT WITH A STORAGE AND NOTIFICATION (S&N) SYSTEM TO DETERMINE WHETHER THE COMPUTING DEVICE IS TO BE ASSIGNED A ROLE OF A LEADER COMPUTING DEVICE OR A FOLLOWER COMPUTING DEVICE
1706

LEADER OR FOLLOWER?
1708

FOLLOWER, CONT. IN FIG. 18

LEADER

INTERACT WITH THE S&N SYSTEM TO DETERMINE WHETHER THERE IS ANY CHANGE IN MEMBERSHIP TO A GROUP OF COMPUTING DEVICES INCLUDED IN THE DISTRIBUTED SYSTEM
1710

WHEN THERE IS A CHANGE IN THE MEMBERSHIP, ENSURE THAT THE CHANGE IS STABLE
1712

WHEN THE CHANGE IS DETERMINED TO BE STABLE, UPDATE AN ASSIGNMENT OF BUCKETS TO COMPUTING DEVICES IN THE DISTRIBUTED SYSTEM SUCH THAT NO TWO COMPUTING DEVICES ARE ASSIGNED A SAME BUCKET
1714

INTERACT WITH THE S&N SYSTEM TO RECORD THE ASSIGNMENT OF BUCKETS
1716

FIG. 17

DISTRIBUTED SYSTEM THAT PROMOTES TASK-MACHINE AFFINITY

BACKGROUND

Distributed systems employ plural computing devices to process data. These systems can use different strategies for assigning tasks to the computing devices. In a traditional master-slave model, a distributed system uses one or more dedicated master computing devices to assign tasks to slave computing devices. In a decentralized approach, a distributed system performs task assignment without the use of dedicated master computing devices. For instance, a distributed system can use a combination of consistent hashing and the gossip protocol to assign tasks to machines. These strategies, however, suffer from various inefficiencies.

SUMMARY

A technique is described herein for allocating tasks within a distributed system. The distributed system includes plural computing devices. Each computing device, in turn, provides a bucket manager and at least one application instance. The bucket managers allocate work to the computing devices in units of buckets, in a manner governed by a set of application-specific initialization parameters. The bucket managers also perform their assignment function in cooperation with a separate storage and notification (S&N) system. The S&N system stores data nodes in a hierarchical data structure that reflect the assignment-related state of the distributed system. The S&N system also notifies the bucket managers upon changes in the data nodes.

More specifically, a bucket manager can operate in a leader role and a follower role. When operating in a leader mode, the bucket manager performs operations of: interacting with the S&N system to determine whether a change in membership has occurred in the distributed system; ensuring that any detected change is stable; upon confirmation of a stable change, updating an assignment of buckets to computing devices in the distributed system such that no two computing devices are assigned a same bucket; and interacting with the S&N system to record the assignment of buckets. Each bucket corresponds to an allotment of work to be performed by a computing device to which it is assigned.

When operating in the follower role, the bucket manager of a computing device performs operations of: interacting with the S&N system to determine whether there is a change of buckets assigned to the computing device; notifying the application instance provided by the computing device of any detected change in buckets; and interacting with the S&N system to claim ownership of any bucket to which it has been newly assigned, and/or to relinquish ownership of any bucket that has been newly removed. When an application instance receives notification that a new bucket has been assigned to it, it loads all the resources that are required to perform tasks associated with that bucket. When the application instance receives notification that an existing bucket has been removed, it removes those resources.

In one implementation, a work-routing component routes a task to a particular bucket by hashing data associated with the task, and then mapping that hash to a particular bucket ID. The work-routing component then sends a task request to the computing device that owns the bucket associated with the particular bucket ID. More generally, each bucket processes all tasks having hashes that map to the bucket.

According to one technical advantage, the bucket manager corresponds to a general-purpose resource that different applications can configure to allocate buckets to computing devices, via respective sets of initialization parameters. The use of a general-purpose bucket manager reduces the burden on an application developer, who otherwise is required to incorporate custom assignment logic into an application.

According to another technical advantage, the bucket manager can use time-out periods and other provisions to ensure that computing devices are stable before assigning work to the computing devices. This behavior promotes the affinity or "stickiness" of tasks to machines. This provision is useful because it reduces the amount of work (and time associated therewith) that is required to load resources that an application instance needs to perform a task (for a newly joining computing device), and to remove these resources (for a newly-departing computing device).

According to another technical advantage, the bucket manager can perform its assignment function without interaction among computing devices in the distributed system. The distributed system achieves this goal by using the S&N system to coordinate its assignment operations, in lieu of device-to-device interaction. This provision reduces the chance that any computing device will become overloaded on account of work performed by its bucket manager.

The above-summarized technique can be manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIGS. 17 and 18 provide a summary of the operations performed by the bucket manager in its leader and follower roles.

Figure 1:
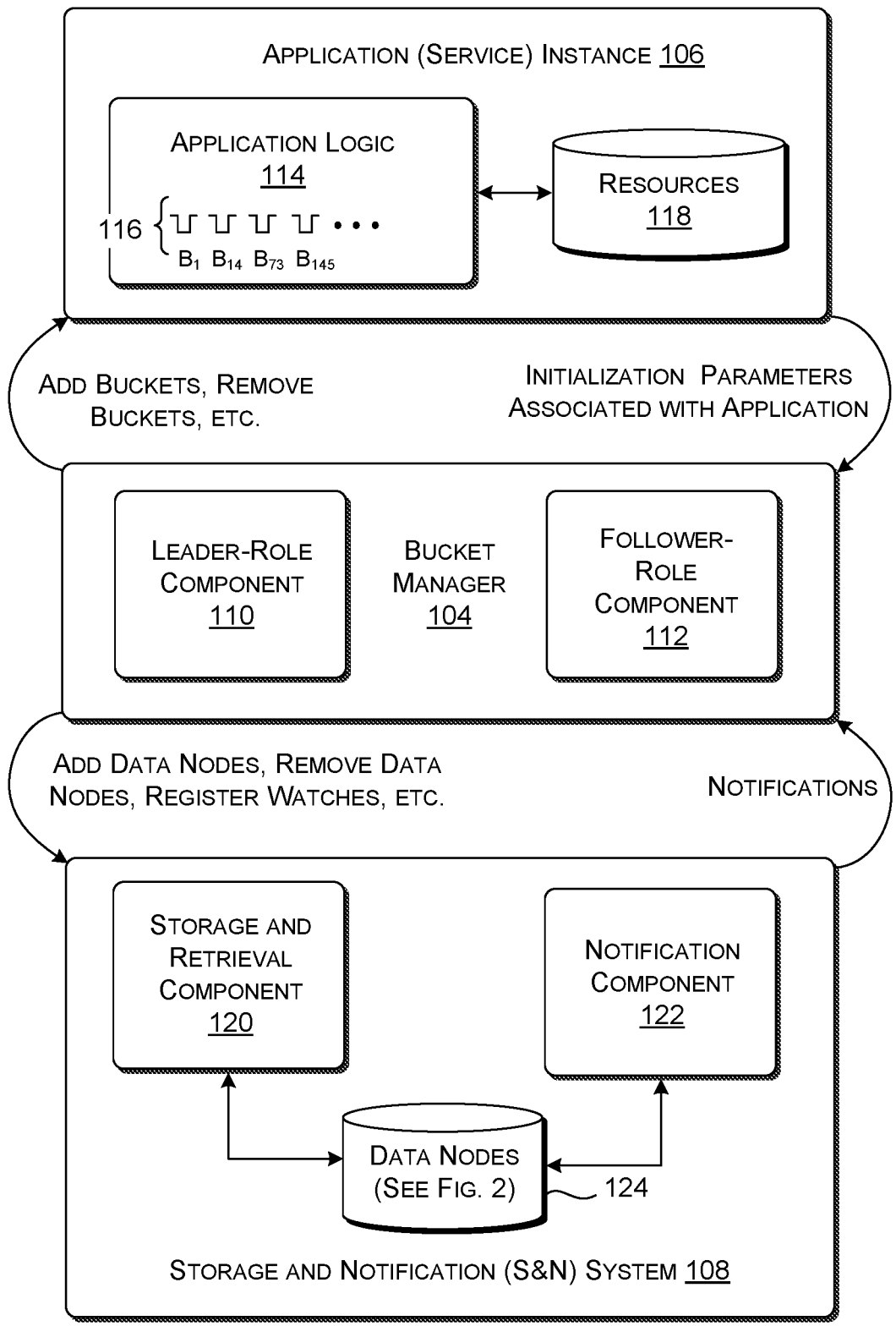
FIG. 1 shows an illustrative organization of logic components provided by a distributed system.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes a distributed system that uses bucket managers to assign work to computing devices. Section B sets forth illustrative methods that explain the operation of the distributed system of Section A. And Section C describes an illustrative computing device that can be used to implement any aspect of the features described in Sections A and B.

As a preliminary matter, the term "hardware logic circuitry" encompasses one or more hardware processors (e.g., CPUs, GPUs, etc.) that execute machine-readable instructions stored in a memory, and/or one or more other hardware logic units (e.g., FPGAs) that perform operations using a task-specific collection of fixed and/or programmable logic gates. Section C provides additional information regarding one implementation of the hardware logic circuitry. In some contexts, each of the terms "component," "tool," and "engine" refers to a part of the hardware logic circuitry that performs a particular function.

In one case, the illustrated separation of various parts in the figures into distinct units may reflect the use of corresponding distinct physical and tangible parts in an actual implementation. Alternatively, or in addition, any single part illustrated in the figures may be implemented by plural actual physical parts. Alternatively, or in addition, the depiction of any two or more separate parts in the figures may reflect different functions performed by a single actual physical part.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). In one implementation, the blocks shown in the flowcharts that pertain to processing-related functions can be implemented by the hardware logic circuitry described in Section C, which, in turn, can be implemented by one or more hardware processors and/or other logic units that include a task-specific collection of logic gates.

As to terminology, the phrase "configured to" encompasses various physical and tangible mechanisms for performing an identified operation. The mechanisms can be configured to perform an operation using the hardware logic circuity of Section C. The term "logic" likewise encompasses various physical and tangible mechanisms for performing a task. For instance, each processing-related operation illustrated in the flowcharts corresponds to a logic component for performing that operation. A logic component can perform its operation using the hardware logic circuitry of Section C. When implemented by computing equipment, a logic component represents an electrical element that is a physical part of the computing system, in whatever manner implemented.

Any of the storage resources described herein, or any combination of the storage resources, may be regarded as a computer-readable medium. In many cases, a computer-readable medium represents some form of physical and tangible entity. The term computer-readable medium also encompasses propagated signals, e.g., transmitted or received via a physical conduit and/or air or other wireless medium, etc. However, the specific term "computer-readable storage medium" expressly excludes propagated signals per se, while including all other forms of computer-readable media.

The following explanation may identify one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Finally, the terms "exemplary" or "illustrative" refer to one implementation among potentially many implementations.

A. Illustrative Distributed System

FIG. 1 shows a hierarchy of logic components 102 (e.g., a software stack) that includes a bucket manager 104, an application 106, and an S&N system 108. As will be described more fully in connection with FIG. 4, each computing device of a distributed system implements an instance of the bucket manager 104 and an instance of the application 106. One or more separate computing devices may implement the S&N system 108.

The bucket manager 104 allocates buckets to computing devices in the distributed system. A bucket demarcates a set of tasks to be handled by a computing device to which the bucket is assigned. For example, a bucket may correspond to a segment of a hash space. A computing device that includes a particular bucket will handle all tasks having hashes that map to the bucket's associated portion of the hash space.

The application 106 uses the allocated buckets in the following manner. A work-routing component (not shown in FIG. 1) first hashes data associated with a task, to produce a hash. The work-routing component then maps the hash to a bucket ID. The bucket ID, in turn, corresponds to a particular bucket. The work-routing component routes a task request to the computing device that currently owns the particular bucket. The computing device then uses its local instantiation of the application 106 to processes the task.

More specifically, consider the merely illustrative case in which the task involves processing data associated with a website. The work-routing component can generate a hash of the Uniform Resource Locator (URL) of the website, and then extract the n most significant bits of the hash to produce a bucket ID, e.g., by right-shifting the hash a prescribed number of positions. This bucket ID, in turn, identifies a particular bucket. The work-routing component then routes a task request associated with the website to the computing device that currently owns the identified bucket.

The bucket manager 104 can operate in a leader role at times. In this role, the bucket manager 104 uses a leader-role component 110 to manage assignment and removal of buckets among the computing devices in the distributed system. At any given time, the distributed system assigns only one bucket manager to operate in the leader role.

Each bucket manager also operates in a follower mode. In this role, the bucket manager 104 uses a follower-role component 112 to receive and act on assignment instructions produced by the leader. More specifically, each bucket manager operates in a follower role, even during those times in which a bucket manager is also serving as a leader.

The application 106 can perform any function or combination of functions using application logic 114. For instance, in the above-mentioned example, the application logic 114 performs the process of converting website data into a form that can be uploaded to a distributed index system. The application logic 114 performs these operations with respect to a set of one or more buckets 116 assigned to it at any given time. In some examples, the application logic 114 also performs its operations using resources provided in a data store 118. The resources may include data, program code, etc. For example, assume that the application logic 114 performs some function that relies on map information associated with a user's current location; in that case, the resources may correspond to relatively large map files.

Upon being instructed by the bucket manager 104 to take ownership of a new bucket, the application logic 114 must perform the potentially time-consuming task of loading appropriate application resources into the data store 118. Upon being instructed by the bucket manager 104 to remove a bucket, the application logic 114 must perform the potentially time-consuming task of purging the application resources from the data store 118. These events are more generally referred to herein as context changes.

The S&N system 108 includes a storage and retrieval component 120 and a notification component 122. The storage and retrieval component 120 stores and removes data nodes in a data store 124 upon instruction from the bucket manager 104. As will be described in greater detail below, the data nodes generally describe the assignment-related state of the distributed system. The notification component 122 notifies the bucket manager 104 of any changes that have occurred to the data nodes in the data store 124. The notification component 122 performs this task in response to receiving watch requests (callback requests) from the bucket manager 104. In one non-limiting implementation, the S&N system 108 can implement aspects of the storage and retrieval component 120 and the notification component 122 using the Zookeeper architecture described in Hunt, et al., "ZooKeeper: Wait-free Coordination for Internet-scale Systems," Proceedings of the 2010 USENIX Annual Technical Conference, 2010, 14 pages. Note, however, that the Zookeeper architecture specifies a general-purpose framework for storing data in response to direct interaction with an application (which defines what data is stored), whereas the architecture of FIG. 1 shows that the application 106 interacts with the S&N system 108 via the intermediary of the bucket manager 104. Further note that the Zookeeper architecture simply stores data without insight as to what the data represents; it is the application that attaches meaning to the data. In other implementations, the bucket manager 104 can work in conjunction with other S&N systems besides those that adopt the Zookeeper architecture.

In one implementation, the bucket manager 104 interacts with the S&N system 108 through a set of application programming interfaces (APIs) provided by the S&N system 108. The application 106 interacts with the bucket manager 104 through a set of APIs offered by the bucket manager 104.

According to one technical advantage, the hierarchy of logic components 102 uses a general-purpose bucket manager 104 to manage the assignment of buckets to the application 106, rather than relying on each application developer to create custom logic that performs this function on the application level. This design therefore simplifies the design of the application. An application developer need only provide an interface that allows the application 106 to interact with the bucket manager 104, e.g., through the APIs offered by the bucket manager 104.

In practice, the application developer also produces a set of initialization parameters that will govern the operation of the bucket manager 104. The application 106 can forward the set of initialization parameters to the bucket manager 104 when the bucket manager 104 is initialized. As used herein, the term "parameter" refers to a pair composed of a parameter variable (such as time-out period) and a parameter value (such as 1 second).

Without limitation, one such parameter specifies a time-out period that controls when the bucket manager 104 can consider a newly-introduced computing device as ready to accept buckets. Another parameter specifies a time-out period that controls when the bucket manager 104 can consider a recently-removed computing device as truly having left the distributed system. Another parameter specifies the optimum number of buckets that each computing device prefers to own. Another parameter specifies a maximum number of buckets that each computing device will accept. Another parameter specifies a minimum number of buckets that each computing device will accept. Another parameter specifies whether a subset of computing devices may operate as standby computing devices, accepting no buckets until a prescribed failure condition is encountered. One or more other parameters may specify amounts of time that the distributed system is allowed to exceed one or more other threshold values (e.g., by exceeding the optimum number of buckets). Another parameter specifies a number of hash buckets to be used (e.g., 256 buckets, 512 buckets, etc.). Another parameter specifies a number of computing devices that the application plans to use, and so on. These parameters are described by way of example, not limitation; other implementations can use yet other parameters not mentioned above, and/or can omit one or more of the parameters mentioned above.

Also note that the application 106 does not directly interact with the S&N system 108. Rather, the application 106 directly interacts with the bucket manager 104, which, in turn, interacts with the S&N system 108. This provision also simplifies the application developer's task of creating an application, e.g., because the application developer need not build a custom interface for interacting with the S&N system 108.

According to another technical advantage, the computing devices that compose the distributed system need not communicate with each other in the course of managing buckets. Rather, the computing devices indirectly coordinate their behavior via the intermediary of the S&N system 108. This provision reduces the load placed any computing device, particularly in the case in which the computing device has a bucket manager that is operating as a leader.

According to another technical advantage, the bucket manager 104 can be configured to reduce the number of context changes caused by adding and removing buckets. As will be explained more fully below, the bucket manager 104 performs this task, in part, by applying one or more time-outs periods to ensure that a newly-added computing device is stable before assigning buckets to it, and/or to ensure that a newly-departed device has truly left before removing its buckets. Stated in another way, these provisions discourage unnecessary or inefficient changes in context, and have the effect of promoting affinity or "stickiness" between tasks performed by computing devices and the computing devices themselves. This is particularly beneficial in those cases in which the application 106 takes an appreciable amount of time to load and/or remove resources from the data store 118. At the same time, the bucket manager 104 remains responsive enough to changes in the distributed system to prevent a computing device that has truly left the distributed system from asserting ownership over buckets, which might negatively affect performance.

The architecture shown in FIG. 1 is superior to a master-slave framework for allocating tasks because a master-slave framework requires the use of a dedicated master computing device. The master-slave framework may offer substandard performance when the master computing device fails or becomes overloaded. The architecture shown in FIG. 1 has advantages over other distributed allocation algorithms because, as set forth above, it promotes affinity between tasks and computing devices, and therefore reduces the number of expensive context changes. It also offers a general-purpose bucket manager that can be "plugged" into different applications without significant application design effort.

Figure 2:
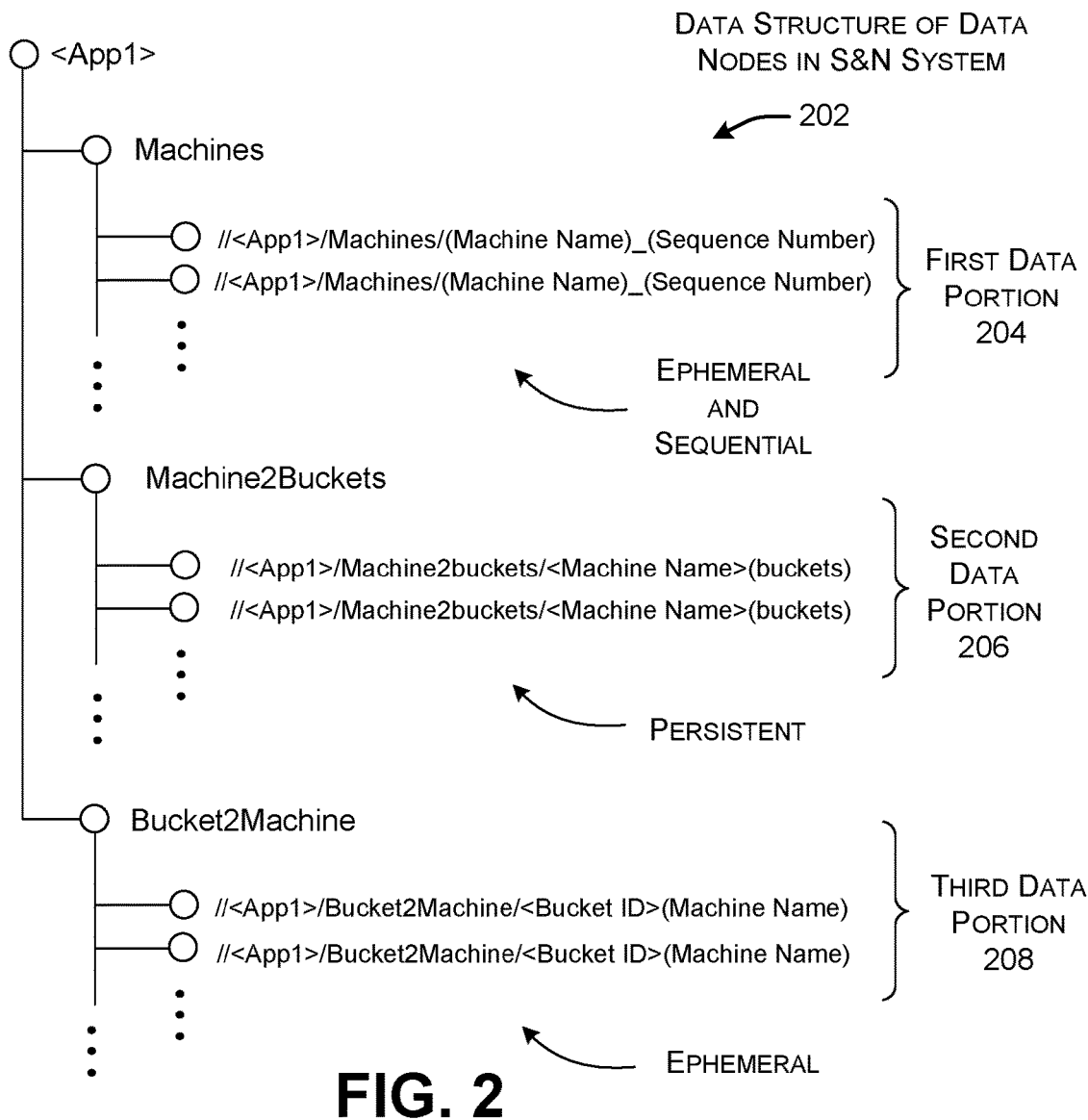
FIG. 2 shows an illustrative hierarchical organization of data nodes provided by a storage and notification (S&N) system. The S&N system, in turn, corresponds to one of the logic components of FIG. 1.

FIG. 2 shows one data structure 202 for storing data nodes in the data store 124 of FIG. 1. From a high-level perspective, the data structure 202 stores information in a hierarchical organization of nodes. In other words, the data structure 202 stores information in a tree-like file system. The bucket manager 104 can identify a data node in the tree by specifying a path from the root node of the data tree to the data node under consideration. The root node of the data tree identifies a particular application (here, "App1"). In some environments, the data store 124 can store plural data structures associated with plural respective applications, having plural respective root nodes (e.g., "App1," "App2," "App3," etc.). This allows a bucket manager 104 to simultaneously manage allocation of buckets for two or more applications running on the same computing devices.

A first data portion 204 of the data structure 202 pertains to a "Machines" data branch. Data nodes that emanate from this branch identify computing devices included in the distributed system at any given time. More specifically, each computing device creates a data node in the first data portion 204 when it joins the distributed system. The storage and retrieval component 120 also automatically removes any data node in the first data portion 204 when its associated computing device shuts down, fails, or otherwise stops servicing a particular application session under consideration. In this sense, the data nodes in the first data portion 204 may be considered as ephemeral or non-persistent.

Further, when creating this type of node, the storage and retrieval component 120 appends data that identifies the temporal position of the node relative to other nodes in the first data portion 204. The bucket manager 104 can leverage the sequence information associated with the data nodes in the first data portion 204 to identify the temporal order in which computing devices joined the distributed system. The bucket manager 104 can use this insight, in turn, to determine whether it should assume the role of leader at any given time. (Additional information regarding this behavior will be set forth below in the description of FIG. 3.)

A second data portion 206 of the data structure 202 is associated with a "Machine2Buckets" data path, which provides information regarding buckets assigned to a particular computing device, given a specified computing device. In other words, the "Machine2Buckets" data path maps a specified machine to its associated buckets. The leader computing device creates and modifies the data nodes in the second data portion 206. A follower computing device can consult the second data portion 206 to determine what buckets have been assigned to it. That is, if the follower computing device corresponds to a computing device X, this device consults a data node in the second data portion 206 associated with device X to find out what buckets have been assigned to it. The storage and retrieval component 120 retains the information in the second data portion 202 for a computing device when that computing device shuts down, fails, or otherwise stops servicing an application session under consideration. In this sense, the data nodes in the second data portion 206 may be considered non-ephemeral or persistent. Also unlike the first data portion 204, the data nodes the second data portion 206 do not capture the order in which the data nodes were created.

A third data portion 208 of the data structure 202 stores data nodes under a "Bucket2Machine" data path, which provides information regarding what computing device is currently asserting ownership of a bucket, given a specified bucket. In other words, the "Bucket2Machine" data maps a specified bucket to the machine that currently owns the bucket. Each computing device that claims ownership of bucket can create a data node in the third data portion 208 to memorialize this event. Each computing device that relinquishes control of a bucket can remove a corresponding data node in the third data portion 208. Prior to claiming ownership of a bucket, a computing device can also consult the third data portion 208 to determine whether the bucket is currently owned by another computing device. Like the first data portion 204, the data nodes in the third data portion 208 may be considered ephemeral or non-persistent. Unlike the first data portion 204, the data nodes in the third data portion 208 do not capture the temporal order in which the data nodes were created.

Figure 3:
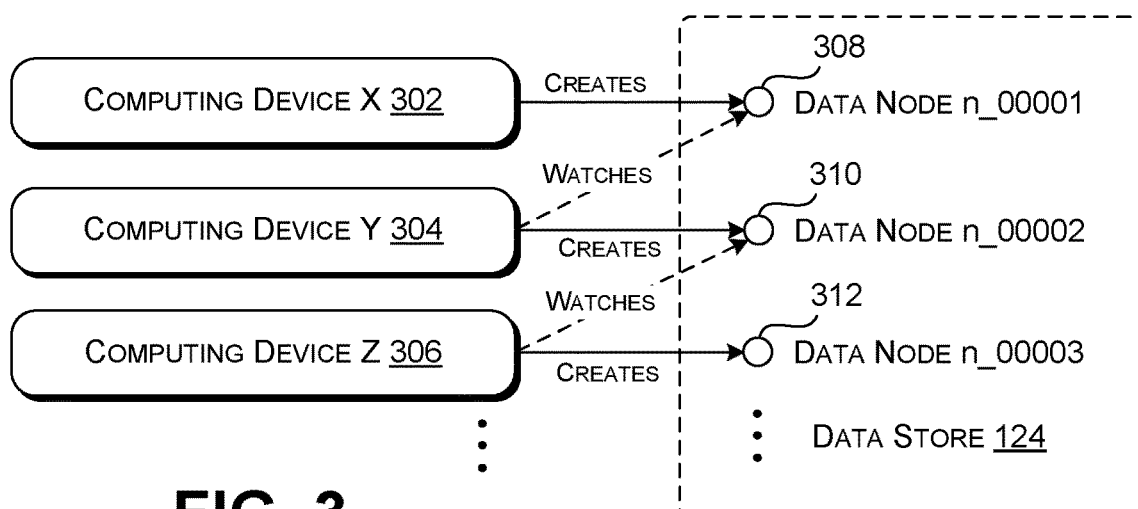
FIG. 3 shows a technique for assigning a leader computing device. This technique leverages the information provided by the S&N system of FIG. 2.

FIG. 3 provides an example of how the bucket managers associated with three computing devices (302, 304, 306) can leverage the data nodes in the data store 124 to determine what bucket manger should operate as a leader. These data nodes specifically correspond to ephemeral-sequential data nodes provided by the first data portion 204.

In operation, the bucket manager of the first computing device X 302 creates a first sequential data node 308 upon its initialization. The bucket manager of the second computing device Y 304 creates a second sequential data node 310 upon its initialization. The bucket manager of the third computing device Z 306 creates a third sequential data node 312 upon its initialization. The three data nodes (308, 310, 312) include information that identifies their relative order. Further, each bucket manager registers to watch whatever data node immediately precedes its own data node. For instance, the third computing device Z 306 registers to receive a notification when any change occurs to the data node 310 associated with the second computing device Y 304. Upon discovering that the data node 310 is removed (e.g., because the second computing device Y 304 has failed or otherwise shuts down), the bucket manager of the third computing device Z 306 will register to watch the immediately-preceding data node—in this case, the data node 308. Finally, a bucket manager that discovers that it has no preceding data node will assume the role of leader. For instance, the bucket manager of the first computing device X 302 determines that it has the earliest-created data node 308, and therefore it should serve the role of leader.

Figure 4:
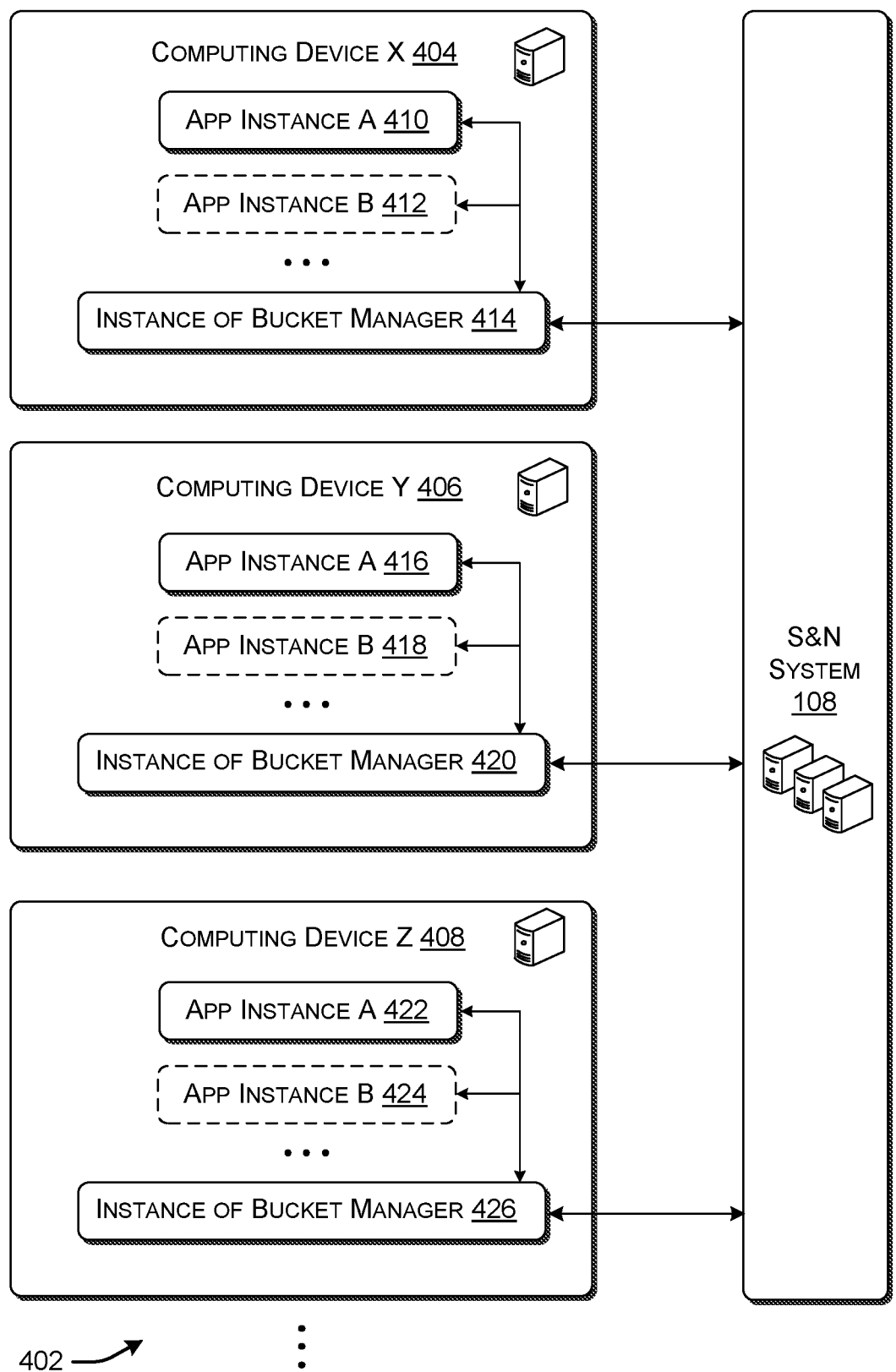
FIG. 4 shows one illustrative distributed system that utilizes the logic components of FIG. 1.

FIG. 4 shows one illustrative distributed system 402 that utilizes the logic components of FIG. 1. More specifically, the distributed system 402 includes three representative computing devices (404, 406, 408), although some environments can include dozens, hundreds, thousands, etc. of computing devices. Each computing device can correspond to a server or any other kind of computing device. Section C describes representative hardware that each computing device may include. Each computing device also interacts with the S&N system 108. The S&N system 108 itself can be implemented using one or more computing devices (e.g., servers). In the case in which the S&N system 108 uses plural computing devices, it can include a mechanism for replicating the information in the data store 124 across the plural computing devices. The computing devices (404, 406, 408) may interact with the S&N system 108 via point-to-point links, a local area network, a wide area network, etc., or any combination thereof.

Each computing device includes one or more application instances and a bucket manager. For example, the computing device X 404 includes an application instance A 410 and an application instance B 412, communicatively coupled to a bucket manager 414. Each application instance performs environment-specific application operations. Further, each application instance loads a set of initialization parameters to the bucket manager 414. Similarly, the computing device Y 406 includes an application instance A 416, an application instance B 418, and a bucket manager 420. The computing device Z 408 includes an application instance A 422, an application instance B 424, and a bucket manager 426. The bucket managers (414, 420, 426) operate in different independent assignment spaces when interacting with different respective applications. To facilitate explanation, however, the remaining description will assume that the bucket managers (414, 420, 426) only work in cooperation with a single application, such as an App A.

At any given time, only one bucket manger is operating as a leader; the other bucket managers operate as followers. Further, at any given time, each application instance may perform its task with respect to a set of buckets. The set of buckets is disjoint across computing devices (with respect to the same application). This means that no two computing devices will be assigned the same bucket at any given time (with respect to the same application). This avoids errors that might occur when two or more computing devices perform duplicative work with respect to the same tasks.

Figure 5:
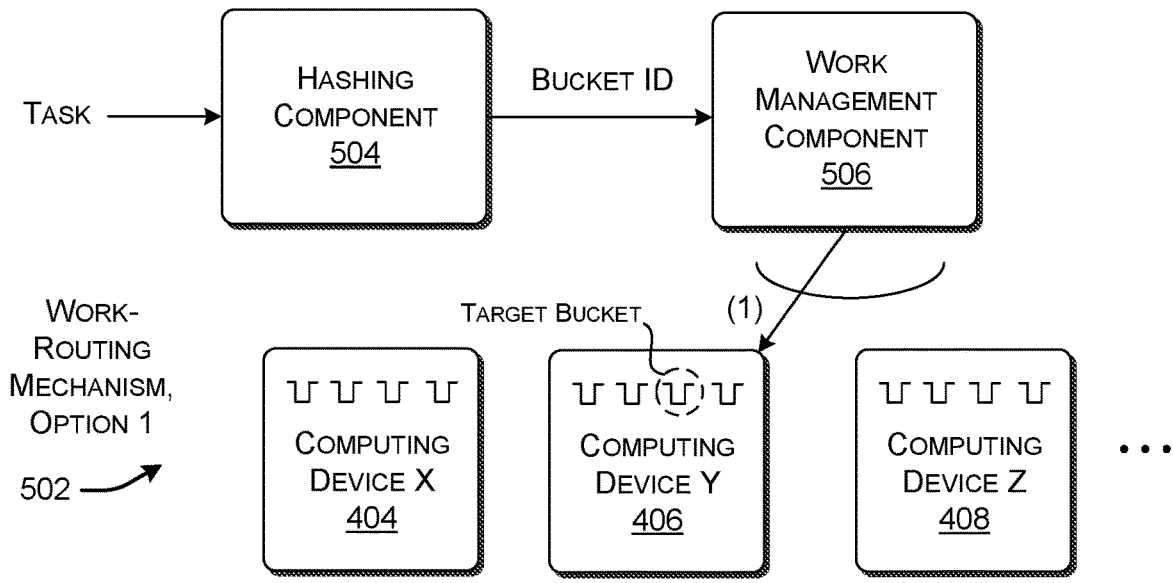
FIGS. 5-7 show three illustrative work-routing components for routing tasks to buckets in the distributed system of FIG. 4.
Figure 6:
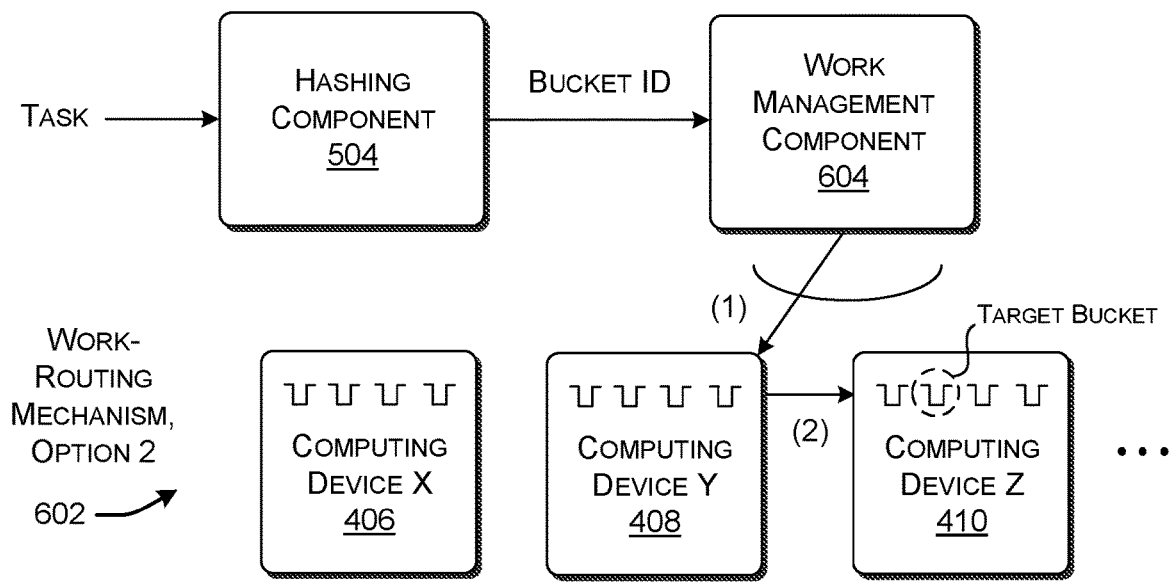
Figure 7:
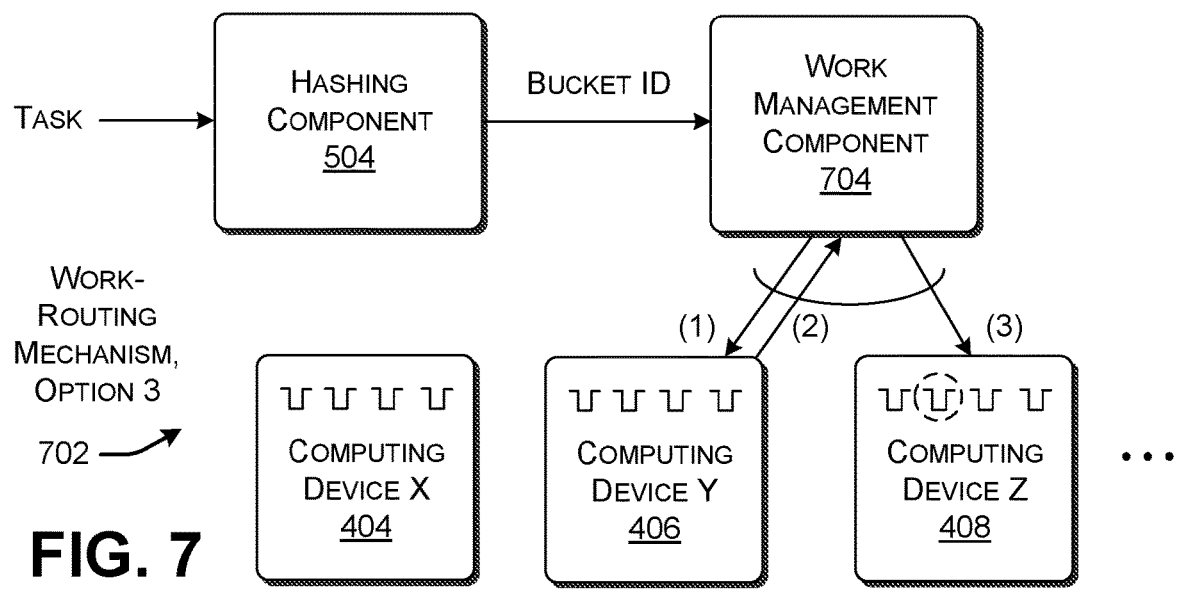

FIGS. 5-7 show three illustrative work-routing components (502, 602, 702) for routing tasks to buckets in the distributed system of FIG. 4. Starting with FIG. 5, a hashing component 504 generates a hash of data associated with a task (such as, without limitation, a 128-bit hash value). For example, again consider the case in which an application performs processing on data associated with a website. The hashing component 504 can generate a hash of a URL associated with the website and/or the page content associated with the website, etc. The hashing component 504 can use any hash algorithm to perform this task, so long as the hash algorithm uniformly distributes hashes across a hash space. Illustrative hash algorithms that can be used include the MD5 algorithm (e.g., described in RFC 1321, 1992), a SHA-family algorithm (e.g., described in RFC 3174, 2001), etc. To provide merely one non-limiting example, the hashing component 504 can apply various environment-specific rules to normalize a URL, append random information to it (by "salting" it), and then process the resultant information using the MD5 algorithm to produce a hash. The hashing component 504 can then extract the n most significant bits of the hash to generate a bucket ID associated with the task under consideration. The bucket ID identifies a particular segment of a hash space. It also identifies a particular bucket.

A work management component 506 uses the bucket ID to forward a task request to the computing device to which the particular bucket is currently assigned. For example, assume that the second computing device Y 406 currently owns the particular bucket associated with the bucket ID. The work management component 506 can forward a task request to the computing device Y 406. The application instance running on the second computing device Y 406 then obtains whatever data is necessary to perform the task, and then performs the task itself. The above behavior assumes that the work management component 506 has access to information provided by the data store 124 that specifies the association between computing devices and buckets.

In the example of FIG. 6, assume that a work management component 604 does not initially know what computing device owns the particular bucket. The work management component 604 can handle this scenario by first forwarding the task request to any randomly-chosen computing device, such as the second computing device Y 406. The work management component 604 can then rely on the second computing device Y 406 to forward the task request to the computing device that actually owns the particular bucket (assuming that the second computing device Y 406 does not currently own the particular bucket). In this case, the second computing device Y 406 forwards the request to the third computing device Z 408. This behavior assumes that the second computing device Y 406 can use the information provided in the data store 124 to determine the computing device that owns the particular bucket.

In the example of FIG. 7, again assume that a work management component 704 does not initially know what computing device owns the particular bucket. And again assume that the work management component 704 first forwards a task request to the second computing device Y 406. In this case, the second computing device Y 406 identifies the computing device that owns the sought-after bucket, and returns this information to the work management component 704. The work management component 704 uses this information to send the task request to the appropriate computing device, here corresponding to the third computing device Z 408.

In the above examples, there is a chance that a target bucket is reassigned while a task request is being sent to a target computing device that currently owns the bucket. The target computing device can address this scenario by automatically forwarding the task request to the correct computing device. Or the target computing device can mark the task request as failed, upon which the work management component can repeat the above-described routing procedures.

The above three examples of work-routing components are described in the spirit of illustration, not limitation. Other implementations can use yet other strategies to forward tasks to appropriate computing devices.

Figure 8:
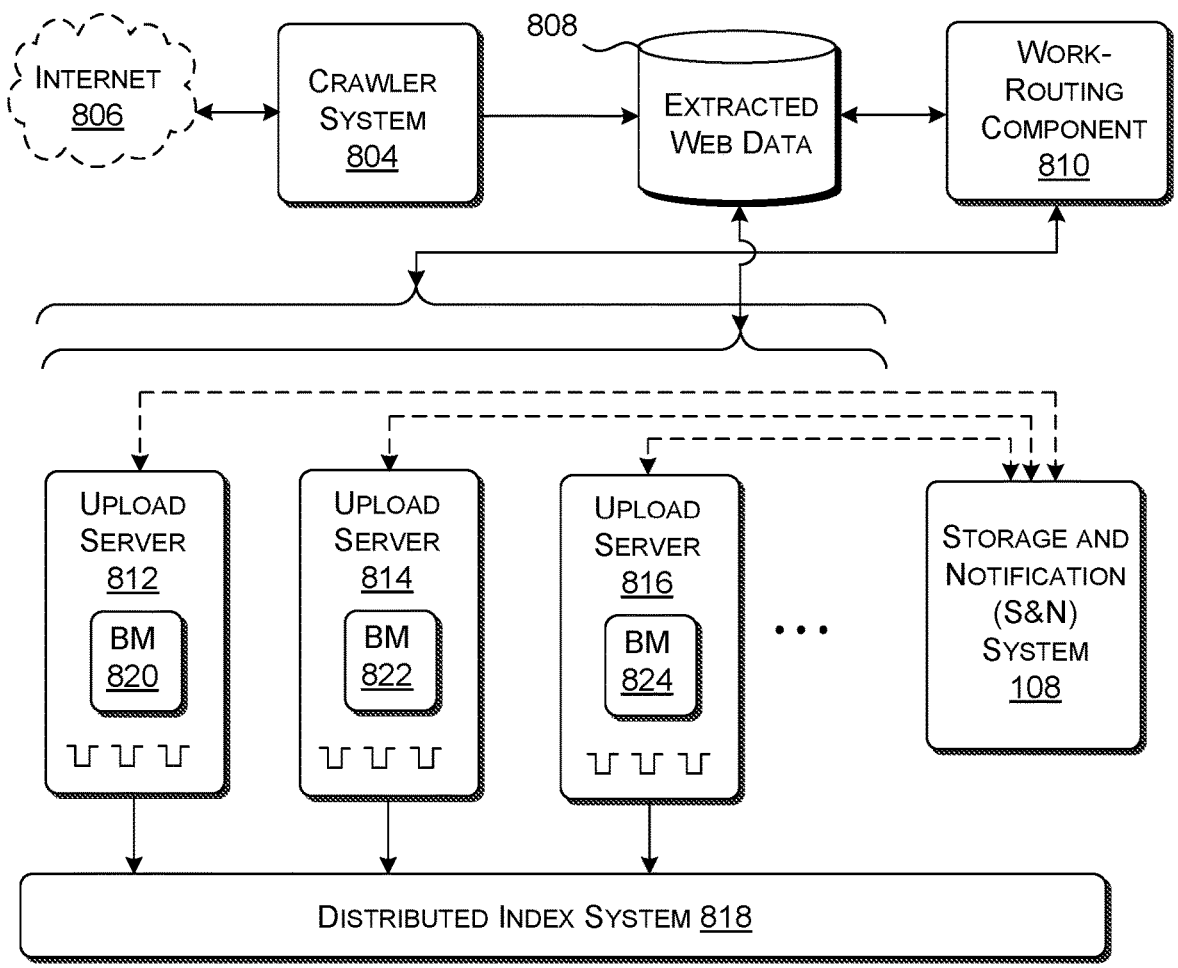
FIG. 8 shows a system that implements an upload service using the logic components of FIG. 1.

FIG. 8 shows a distributed system 802 that implements an upload service using the logic components of FIG. 1. In this environment, a crawler system 804 crawls the Internet 806 to discover new websites, or websites that have been newly modified (compared to an immediately-preceding crawling operation). The crawler system 804 stores a data entry regarding each such-identified website in a data store 808. A work-routing component 810 then sends one or more task requests to a distributed system that includes plural upload servers (812, 814, 816). In one case, each such task request instructs an upload server to process website data associated with a single URL that maps to bucket owned by the upload server. In another case, each task request instructs an upload server to process a batch of websites having respective URLs that map to a bucket owned by the upload server. Upon receiving such a request, an uploader server pulls the appropriate data from the data store 808 and processes it. More specifically, each upload server converts the data associated with a website into a reverse index format that can be consumed by a distributed index system 818. The upload server then transfers the processed data to the distributed index server 818. A search engine (not shown) uses the distributed index system 818 to map query terms submitted by users to websites that contain those query terms.

The upload servers (812, 814, 816) include respective bucket managers (BMs) (820, 822, 824) that collectively allocate buckets to upload servers (812, 814, 816). To perform this task, each bucket manager interacts with the S&N system 108. As noted above, at any given time, only one bucket manager operates as a leader. Further, at any given time, no two uploader servers owns the same bucket.

Bucket allocation is "expensive" in the upload service because it requires appreciable time and resources to perform, and thus negatively affects system throughput. For instance, upon being assigned a new bucket, the upload service needs to parse different files to determine the status of the upload process with respect to the work associated with the bucket. The upload service also needs to identify and remove temporary files left behind by the previous owner of the bucket, and so on. The technique described herein helps reduce these expensive bucket reassignments.

The example of FIG. 8 is presented in the spirit of illustration, not limitation. Other implementations can use the architecture shown in FIG. 4 to perform any other application tasks.

B. Illustrative Processes

FIGS. 9-18 show processes that explain the operation of the distributed system of Section A in flowchart form. Since the principles underlying the operation of the distributed system have already been described in Section A, some operations will be addressed in summary fashion in this section. As noted in the prefatory part of the Detailed Description, each flowchart is expressed as a series of operations performed in a particular order. But the order of these operations is merely representative, and can be varied in any manner.

Further, FIGS. 9-18 will be explained with reference to the distributed system 402 of FIG. 4 in conjunction with the data structure 202 of FIG. 2. To simplify explanation, these figures will refer to one particular computing device in this distributed system 402 as computing device X. Computing device X has a bucket manager $X_{BM}$ and an application instance $X_{APP}$. For example, with reference to FIG. 4, the computing device X may correspond to the computing device X 404, the bucket manager $X_{BM}$ may correspond to the bucket manager 414, and the application instance $X_{APP}$ may correspond to the application instance A 410.

Figure 9:
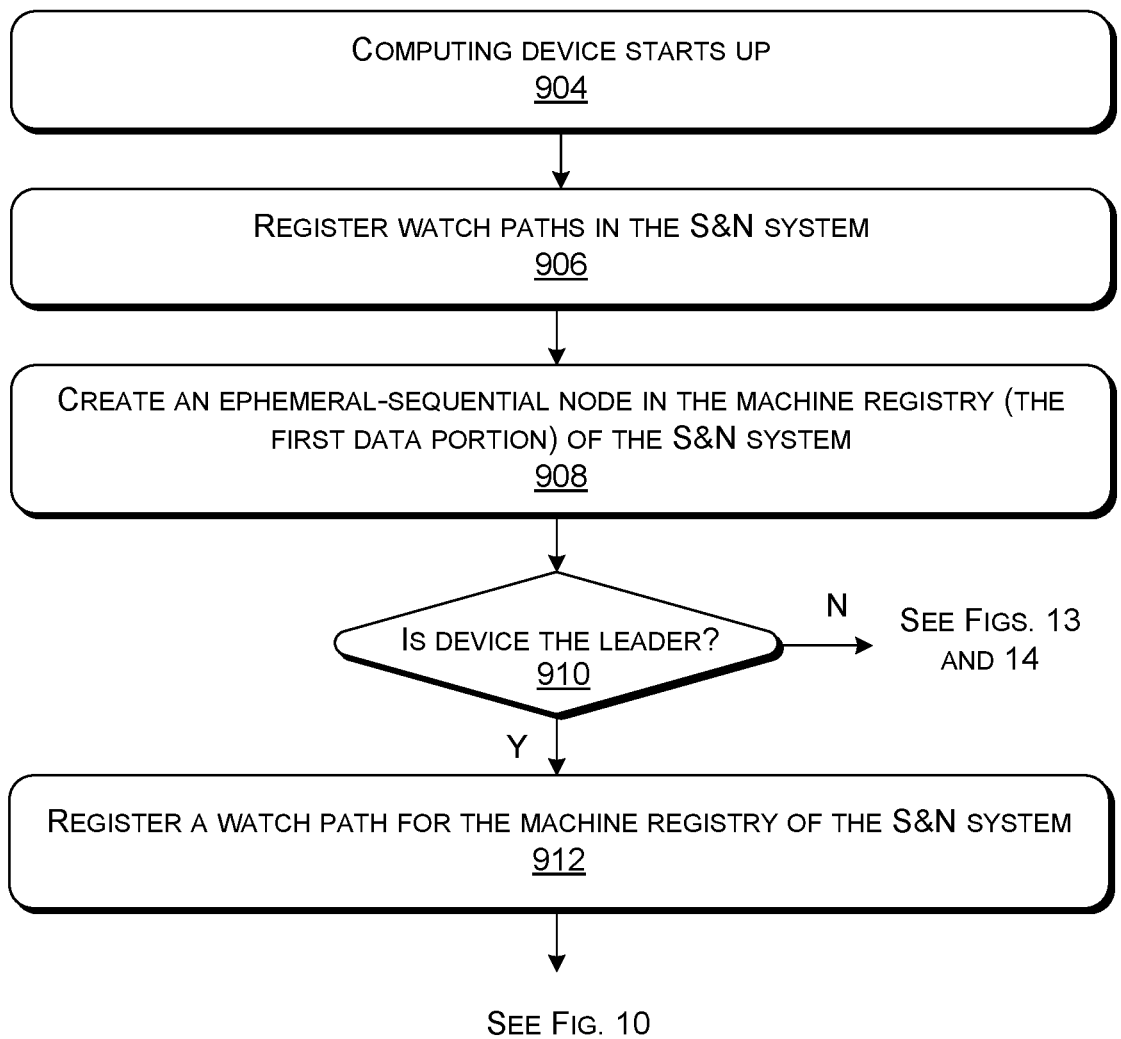
FIG. 9 shows operations performed by a bucket manager when a computing device starts up.

FIG. 9 shows a process 902 performed by a bucket manager $X_{BM}$ when the computing device X starts up. More specifically, in block 904, the computing device X starts up. In block 906, the bucket manager $X_{BM}$ interacts with the S&N system 108 to register watch paths. More specifically, the bucket manager $X_{BM}$ registers to receive a notification under the "Machine2Buckets" path (in the second data portion 206) for changes to assignment information pertinent to the computing device X. The bucket manager $X_{BM}$ also registers to receive information under the "Bucket2Machine" data path (in the third data portion 208) for all buckets. Given a specified bucket, this information reveals which computing device owns the bucket. In block 908, the bucket manager $X_{BM}$ creates an ephemeral-sequential node under the "Machines" data path (in the first data portion 204), to thereby register its presence and the timing at which it joined the distributed system 402.

In block 910, the bucket manager $X_{BM}$ determines whether it is the leader. The bucket manager $X_{BM}$ can perform this task by determining whether its ephemeral-sequential node is the first-created node in the first data portion 204. If so, the bucket manager $X_{BM}$ for the computing device X takes on the role as leader. In block 912, the bucket manager $X_{BM}$ then registers a watch path to receive notifications when any data node in the first data portion 204 changes. These nodes will change, for instance, when a new computing device joins the distributed system 402, or when an existing computing device leaves the distributed system 402. Alternatively, if block 910 is answered in the negative, then the computing device X assumes the role as follower. (Although not reflected in FIG. 9, a leader computing device simultaneously operates as a follower computing device.)

Figure 10:
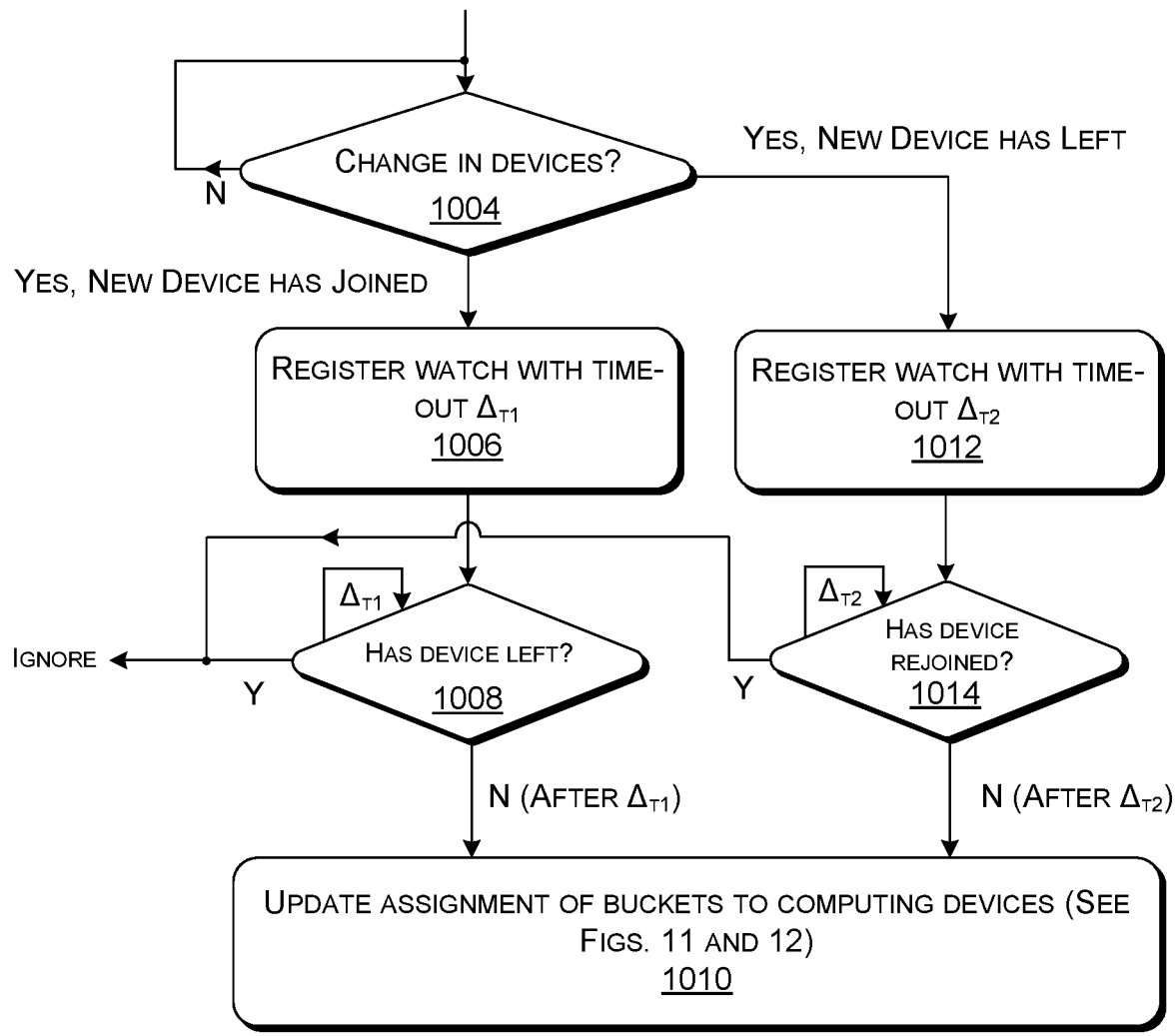
FIGS. 10-12 show operations performed by a bucket manager when acting in a leader role.
Figures 11, 12:
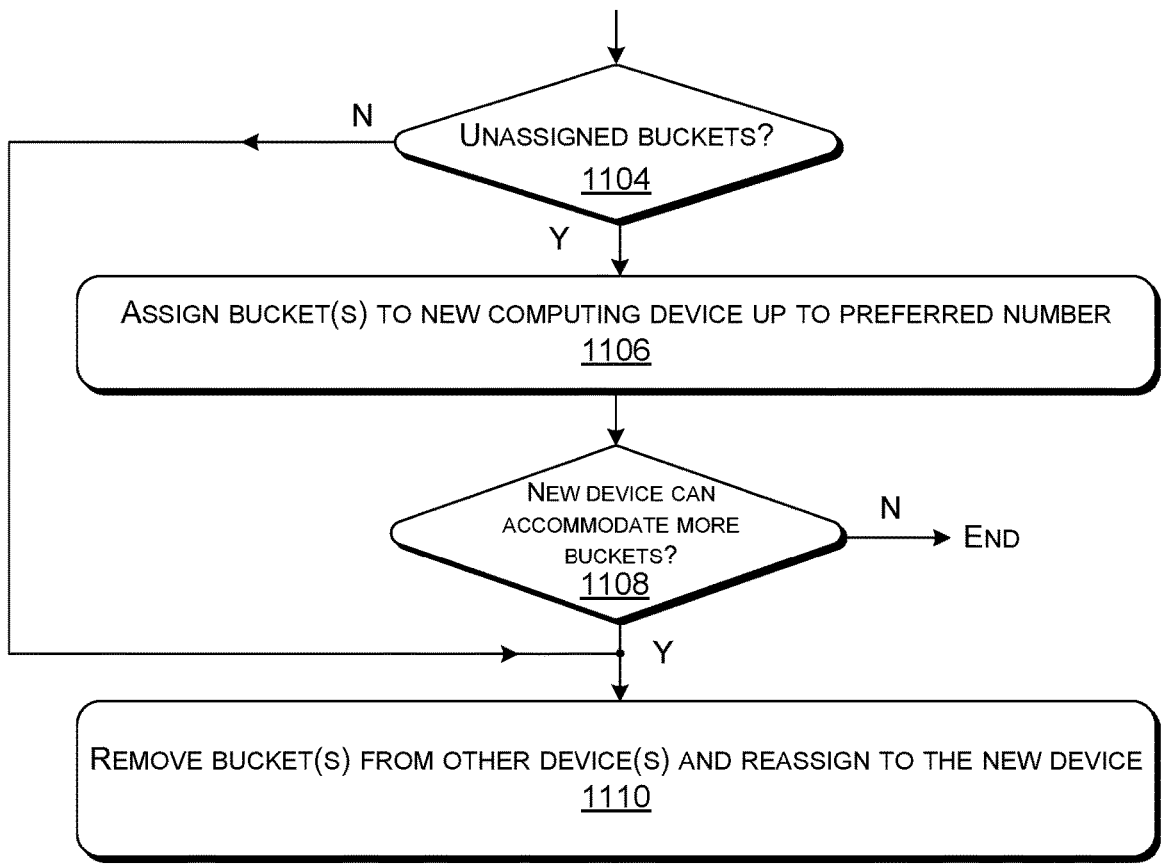

FIGS. 10-12 show operations performed by the bucket manager $X_{BM}$ of the computing device X, when acting in a leader role. Starting with FIG. 10, this figure shows a process 1002 for initiating an update to the assignments of the computing devices in the distributed system 402. In block 1004, the bucket manager $X_{BM}$ determines whether there is any change to computing devices in the distributed system 402. The bucket manager $X_{BM}$ determines there is a change when it receive a notification from the S&N system 108 (under the "Machines" path), notifying it of a change to one or more data nodes in the first data portion 204.

Assume that the bucket manager $X_{BM}$ specifically determines that a new computing device has joined the distributed system. If so, in block 1006, the bucket manager $X_{BM}$ registers a watch with a time period of $\Delta_{T1}$. This time period corresponds to a parameter set by the application instance $X_{APP}$ upon initialization of the bucket manager $X_{BM}$. In block 1008, the bucket manager $X_{BM}$ determines whether the new computing device has subsequently left the distributed system 402. If this event occurs within the time period defined by $\Delta_{T1}$ then the bucket manager 414 will ignore new computing device. On the other hand, in block 1010, the bucket manager $X_{BM}$ will begin updating the assignments of buckets to computing devices if the time period $\Delta_{T1}$ expires without the removal of the new computing device. That is, at this juncture, the bucket manager $X_{BM}$ considers the new computing device to be stable.

Alternatively assume that the bucket manager $X_{BM}$ determines, in block 1004, that an existing computing device has left the distributed system 402. If so, in block 1012, the bucket manager $X_{BM}$ registers a watch with a time period of $\Delta_{T2}$. In block 1014, the bucket manager $X_{BM}$ determines whether the computing device that has left has rejoined the distributed system 402. If this event occurs within the time period defined by $\Delta_{T2}$ then the bucket manager $X_{BM}$ will ignore the departure of the computing device. In block 1010, the bucket manager $X_{BM}$ will begin updating the assignment of buckets to computing devices if the time period $\Delta_{T2}$ expires without the reunification of the computing device that has left the distributed system 402.

FIG. 11 shows a process 1102 whereby the bucket manager $X_{BM}$ updates assignments when a new computing device joins the distributed system 402. In block 1104, the bucket manager $X_{BM}$ determines whether there are any unassigned buckets. If so, in block 1106, the bucket manager $X_{BM}$ can assign a number of buckets to the new computing device, corresponding to the preferred number of buckets specified in the set of initialization parameters. In block 1108, the bucket manager $X_{BM}$ determines whether the computing device can accept more buckets, yet there are no more unassigned buckets to give to it. If so, in block 1110, the bucket manager $X_{BM}$ can remove buckets from one or more other computing devices and reassign these buckets to the newly joined computing device. For example, the bucket manager $X_{BM}$ can remove buckets from at least one existing computing device that has more than its preferred number, and reassign those buckets to the newly joined computing device.

FIG. 12 shows a process 1202 in which the bucket manager $X_{BM}$ updates assignments when an existing computing device leaves the distributed system 402. In block 1204, the bucket manager $X_{BM}$ assigns one or more buckets from the departed computing device to one or more existing computing devices having the least number of buckets, or which otherwise express the greatest demand for additional buckets.

Note that the bucket allocation strategy described in FIGS. 11 and 12 is set forth in the spirit of illustration not limitation. Other implementations can use other strategies to distribute buckets to machines upon the introduction and removal of computing devices in the distributed system 402. For example, in another case, a leader computing device can allow a subset of computing devices to accept no buckets. The distributed system 402 can rely on these unburdened computing devices upon the occurrence of a prescribed failure condition in the distributed system 402, such as a service metric falling below a prescribed threshold.

Figure 13:
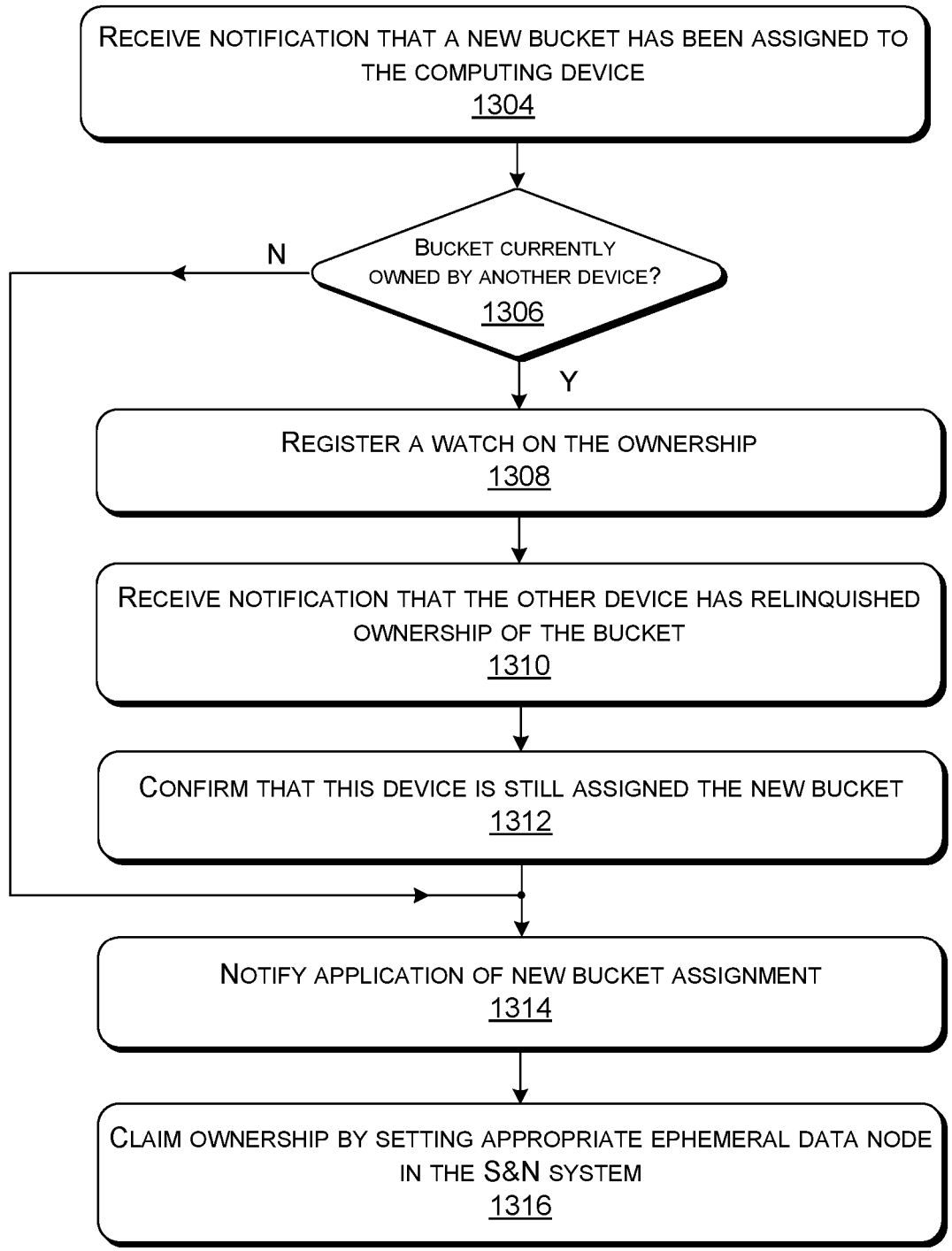
FIGS. 13 and 14 show operations performed by a bucket manager when acting in a follower role.
Figure 14:
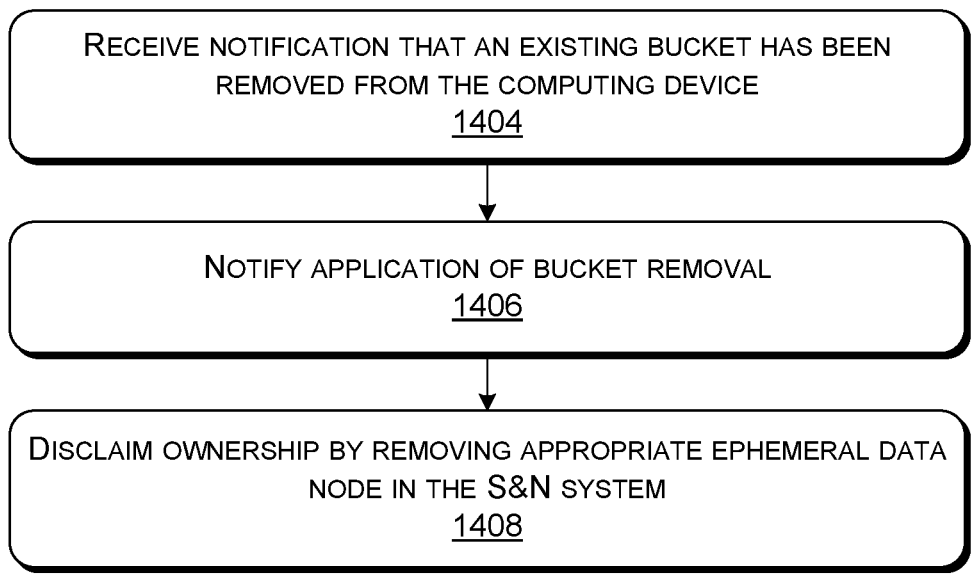

FIGS. 13 and 14 show operations performed by the bucket manager $X_{BM}$ of the computing device X when acting in a follower role. More specifically, FIG. 13 shows a process 1302 performed by the bucket manager $X_{BM}$ when the bucket manager $X_{BM}$ discovers that it has been assigned at least one new bucket by the leader. The leader may correspond to the bucket manager of another computing device (for example, bucket manager $Y_{BM}$ of computing device Y), or the bucket manager $X_{BM}$ of the same computing device X.

In block 1304, the bucket manager $X_{BM}$ receives a notification from the S&N system 108 that informs it that a new bucket has been assigned to its computing device. It receives this notification because it has previously registered a watch on the "Machine2Buckets" data path, for computing device X. In block 1306, the bucket manager $X_{BM}$ determines whether the bucket that has been assigned is currently owned by another computing device. It performs this task by interrogating the "Bucket2Machine" data path to discover whether it contains any data. Assume that block 1306 is answered in the affirmative. In block 1308, the bucket manager 414 registers a watch on the "Bucket2Machine" data path. In block 1310, the bucket manager $X_{BM}$ receives a notification that the device that was previously claiming ownership of the bucket has relinquished that ownership. In block 1312, the bucket manager $X_{BM}$ confirms whether it is still assigned the bucket under consideration by again checking the "Machine2Buckets" data path.

At this juncture, the bucket manager $X_{BM}$ is ready assume ownership over the newly-assigned bucket. In block 1314, the bucket manager $X_{BM}$ uses an AddBucket callback to notify the application instance $X_{APP}$ associated with the computing device X that it should begin processing tasks for the newly assigned bucket. In block 1316, the bucket manager $X_{BM}$ formally claims ownership of the newly-assigned bucket by setting an appropriate data node in the third data portion 208, that is, under the "Bucket2Machine" data path.

FIG. 14 shows a process 1402 performed by the bucket manager $X_{BM}$ of the follower computing device X upon the removal a bucket assigned to it. In block 1404, the bucket manager $X_{BM}$ receives a notification under the "Machine2Buckets" data path, indicating that a bucket previously assigned to it has been removed. In block 1406, the bucket manager $X_{BM}$ responds by notifying the application instance $X_{APP}$ running on the computing device X to remove a previously-assigned bucket. In block 1408, the bucket manager $X_{BM}$ formally disclaims ownership of the removed bucket by removing an appropriate ephemeral data node in the third data portion 208, under the "Bucket2Machine" data path.

Figure 15:
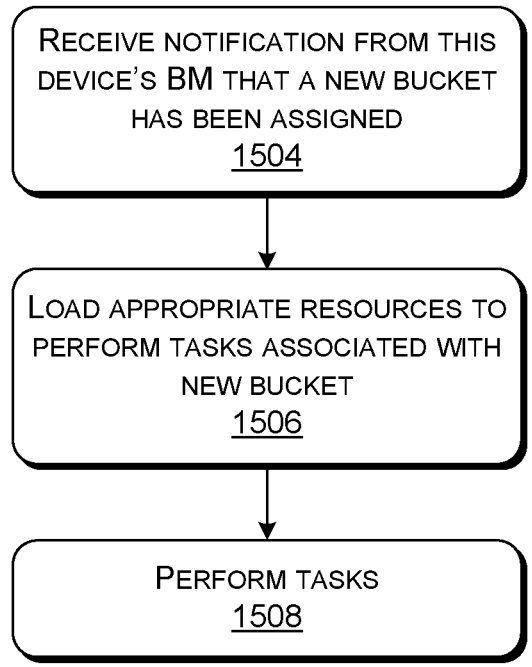
FIGS. 15 and 16 show operations performed by an application instance upon receiving notification of a new bucket (with respect to FIG. 15) and upon receiving notification of the removal of an existing bucket (with respect to FIG. 16).
Figure 16:
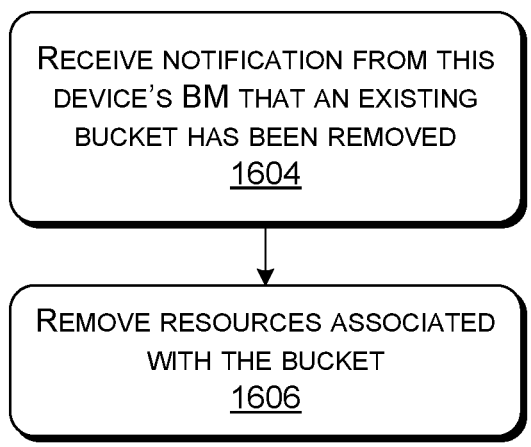

FIGS. 15 and 16 show operations performed by an application instance $X_{APP}$ upon receiving notification of a new bucket (with respect to FIG. 15) or the removal of an existing bucket (with respect to FIG. 16). More specifically, FIG. 15 shows a process 1502 for handling the case in which a new bucket is assigned to the application instance $X_{APP}$. In block 1504, the application instance $X_{APP}$ receives a notification from its associated bucket manager $X_{BM}$ that a new bucket has been assigned to it. In block 1506, the application instance $X_{APP}$ loads appropriate resources that enable it to perform tasks associated with the newly-assigned bucket. In block 1508, the application instance $X_{APP}$ performs those tasks (e.g., upon being fed these tasks by a work management component).

FIG. 16 shows a process 1602 for handling the case in which an existing bucket is removed by the application instance $X_{APP}$. In block 1604, the application instance $X_{APP}$ receives a notification from its associated bucket manager $X_{BM}$ that an existing bucket has been removed. In block 1606, the application instance $X_{APP}$ removes resources that it has previously used to process tasks associated with the bucket that has now been removed.

Figure 18:
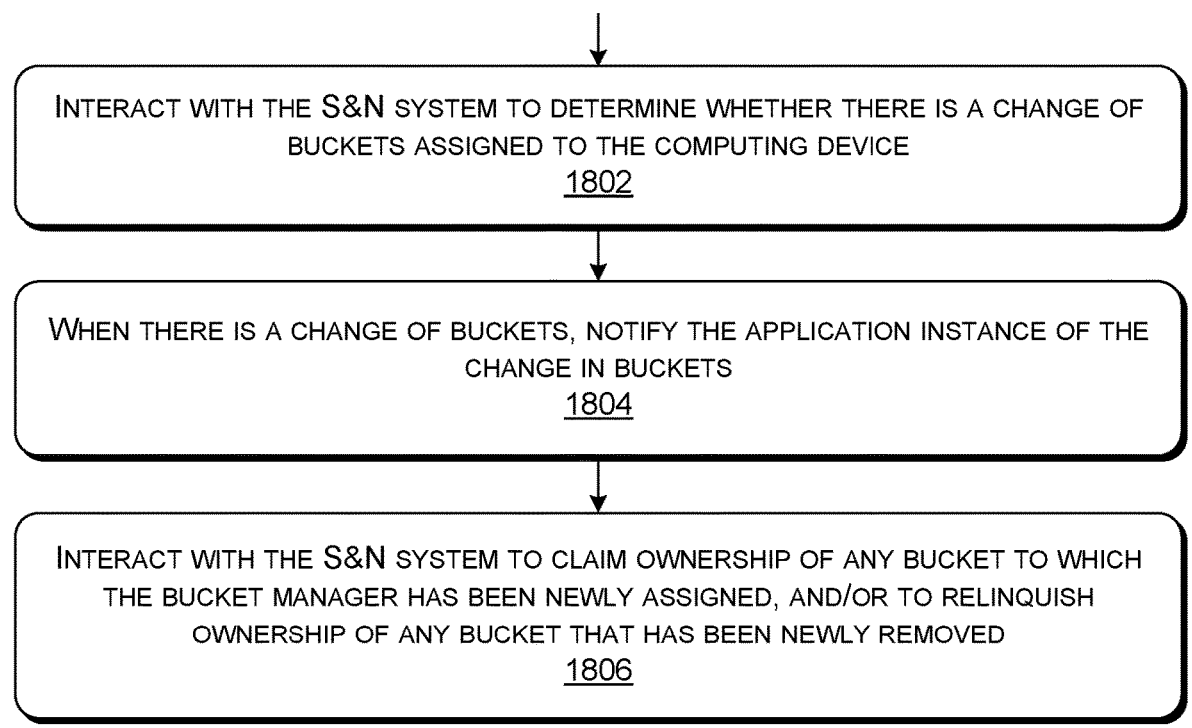

FIGS. 17 and 18 together show a process 1702 that provides a summary of the operations performed by a bucket manager $X_{BM}$, in both its leader and follower roles. Again assume that the bucket manager $X_{BM}$ is associated with the computing device X.

In block 1704, the process 1702 involves initializing the bucket manager $X_{BM}$ based on initialization parameters received from the application instance $X_{APP}$. The bucket manager $X_{BM}$ corresponds to a general-purpose component that can be reconfigured by different sets of initialization parameters to work in conjunction with different application instances. In blocks 1706 and 1708, the bucket manager $X_{BM}$ interacts with the S&N system 108 to determine whether the computing device X 404 is to be assigned a role of a leader computing device.

When operating in a leader role, in block 1710, the bucket manager $X_{BM}$ interacts with the S&N system 108 to determine whether there is any change in membership to a group of computing devices included in the distributed system 402. In block 1712, when there is a change in the membership, the bucket manager $X_{BM}$ ensures that the change is stable. In block 1714, when the change is determined to be stable, the bucket manager $X_{BM}$ updates an assignment of buckets to computing devices in the distributed system 402 such that no two computing devices are assigned a same bucket, each bucket corresponding to an allotment of work to be performed. In block 1716, the bucket manager $X_{BM}$ interacts with the S&N system 108 to record the assignment of buckets.

When operating in a follower role, in block 1802 of FIG. 18, the bucket manager $X_{BM}$ interacts with the S&N system 108 to determine whether there is a change of buckets assigned to the computing device X. In block 1804, when there is a change of buckets, the bucket manager $X_{BM}$ notifies the application instance $X_{APP}$ of the change in buckets. In block 1806, the bucket manager $X_{BM}$ interacts with the S&N system 108 to claim ownership of any bucket to which the bucket manager $X_{BM}$ has been newly assigned, and/or to relinquish ownership of any bucket that has been newly removed.

C. Representative Computing Device

Figure 19:
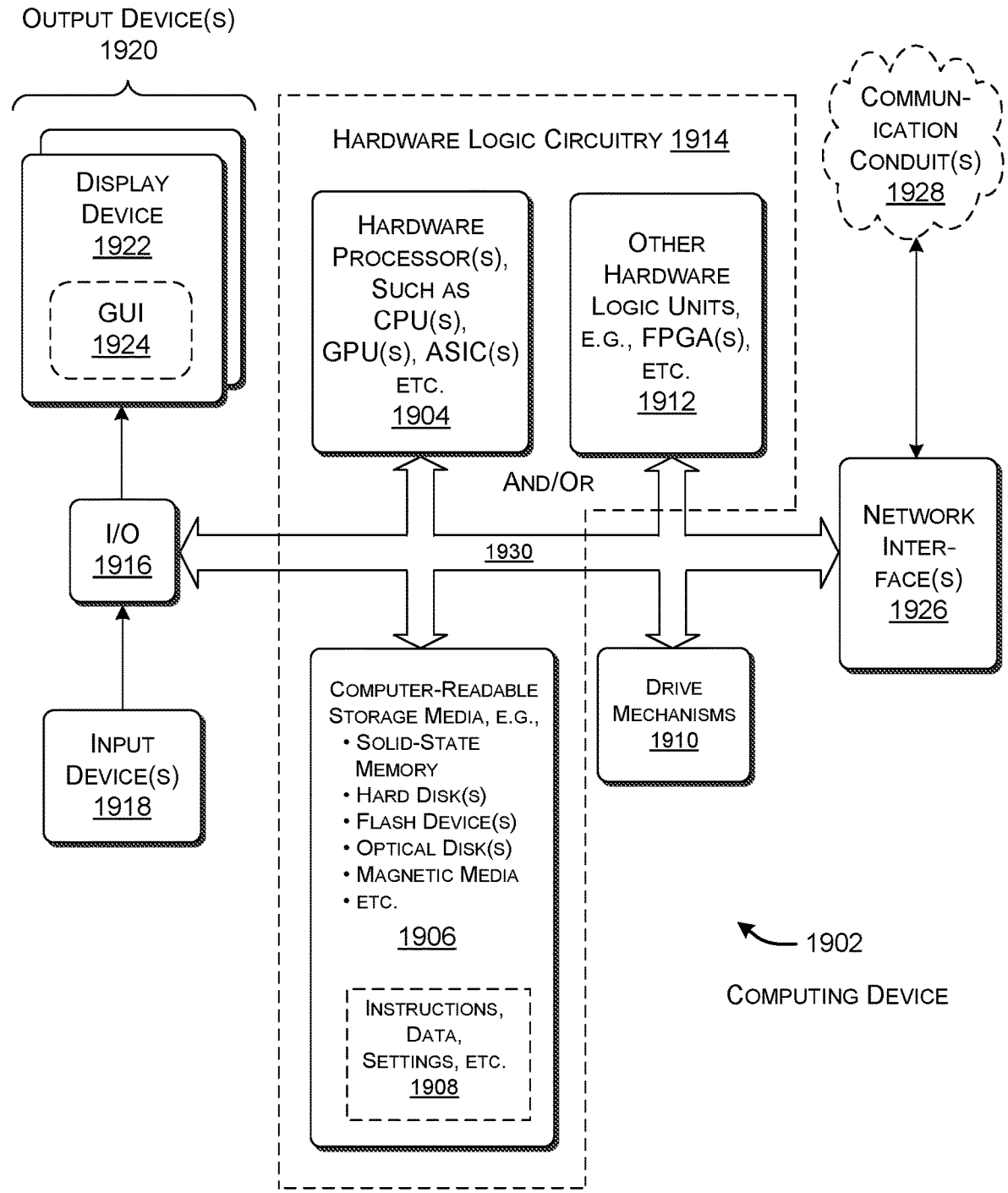
FIG. 19 shows an illustrative type of computing device that can be used to implement any aspect of the features shown in the foregoing drawings.

FIG. 19 shows a computing device 1902 that can be used to implement any aspect of the mechanisms set forth in the above-described figures. For instance, with reference to FIG. 4, the type of computing device 1902 shown in FIG. 19 can be used to implement any computing device (404, 406, 408) in the distributed system 402, or any computing device that is used to implement the S&N system 108, etc. In all cases, the computing device 1902 represents a physical and tangible processing mechanism.

The computing device 1902 can include one or more hardware processors 1904. The hardware processor(s) can include, without limitation, one or more Central Processing Units (CPUs), and/or one or more Graphics Processing Units (GPUs), and/or one or more Application Specific Integrated Circuits (ASICs), etc. More generally, any hardware processor can correspond to a general-purpose processing unit or an application-specific processor unit.

The computing device 1902 can also include computer-readable storage media 1906, corresponding to one or more computer-readable media hardware units. The computer-readable storage media 1906 retains any kind of information 1908, such as machine-readable instructions, settings, data, etc. Without limitation, for instance, the computer-readable storage media 1906 may include one or more solid-state devices, one or more magnetic hard disks, one or more optical disks, magnetic tape, and so on. Any instance of the computer-readable storage media 1906 can use any technology for storing and retrieving information. Further, any instance of the computer-readable storage media 1906 may represent a fixed or removable unit of the computing device 1902. Further, any instance of the computer-readable storage media 1906 may provide volatile or non-volatile retention of information.

The computing device 1902 can utilize any instance of the computer-readable storage media 1906 in different ways. For example, any instance of the computer-readable storage media 1906 may represent a hardware memory unit (such as Random Access Memory (RAM)) for storing transient information during execution of a program by the computing device 1902, and/or a hardware storage unit (such as a hard disk) for retaining/archiving information on a more permanent basis. In the latter case, the computing device 1902 also includes one or more drive mechanisms 1910 (such as a hard drive mechanism) for storing and retrieving information from an instance of the computer-readable storage media 1906.

The computing device 1902 may perform any of the functions described above when the hardware processor(s) 1904 carry out computer-readable instructions stored in any instance of the computer-readable storage media 1906. For instance, the computing device 1902 may carry out computer-readable instructions to perform each block of the processes described in Section B.

Alternatively, or in addition, the computing device 1902 may rely on one or more other hardware logic units 1912 to perform operations using a task-specific collection of logic gates. For instance, the hardware logic unit(s) 1912 may include a fixed configuration of hardware logic gates, e.g., that are created and set at the time of manufacture, and thereafter unalterable. Alternatively, or in addition, the other hardware logic unit(s) 1912 may include a collection of programmable hardware logic gates that can be set to perform different application-specific tasks. The latter category of devices includes, but is not limited to Programmable Array Logic Devices (PALs), Generic Array Logic Devices (GALs), Complex Programmable Logic Devices (CPLDs), Field-Programmable Gate Arrays (FPGAs), etc.

FIG. 19 generally indicates that hardware logic circuitry 1914 includes any combination of the hardware processor(s) 1904, the computer-readable storage media 1906, and/or the other hardware logic unit(s) 1912. That is, the computing device 1902 can employ any combination of the hardware processor(s) 1904 that execute machine-readable instructions provided in the computer-readable storage media 1906, and/or one or more other hardware logic unit(s) 1912 that perform operations using a fixed and/or programmable collection of hardware logic gates. More generally stated, the hardware logic circuitry 1914 corresponds to one or more hardware logic units of any type(s) that perform operations based on logic stored in and/or otherwise embodied in the hardware logic unit(s).

In some cases (e.g., in the case in which the computing device 1902 represents a user computing device), the computing device 1902 also includes an input/output interface 1916 for receiving various inputs (via input devices 1918), and for providing various outputs (via output devices 1920). Illustrative input devices include a keyboard device, a mouse input device, a touchscreen input device, a digitizing pad, one or more static image cameras, one or more video cameras, one or more depth camera systems, one or more microphones, a voice recognition mechanism, any movement detection mechanisms (e.g., accelerometers, gyroscopes, etc.), and so on. One particular output mechanism may include a display device 1922 and an associated graphical user interface presentation (GUI) 1924. The display device 1922 may correspond to a liquid crystal display device, a light-emitting diode display (LED) device, a cathode ray tube device, a projection mechanism, etc. Other output devices include a printer, one or more speakers, a haptic output mechanism, an archival mechanism (for storing output information), and so on. The computing device 1902 can also include one or more network interfaces 1926 for exchanging data with other devices via one or more communication conduits 1928. One or more communication buses 1930 communicatively couple the above-described units together.

The communication conduit(s) 1928 can be implemented in any manner, e.g., by a local area computer network, a wide area computer network (e.g., the Internet), point-to-point connections, etc., or any combination thereof. The communication conduit(s) 1928 can include any combination of hardwired links, wireless links, routers, gateway functionality, name servers, etc., governed by any protocol or combination of protocols.

FIG. 19 shows the computing device 1902 as being composed of a discrete collection of separate units. In some cases, the collection of units may correspond to discrete hardware units provided in a computing device chassis having any form factor. In other cases, the computing device 1902 can include a hardware logic unit that integrates the functions of two or more of the units shown in FIG. 1. For instance, the computing device 1902 can include a system on a chip (SoC or SOC), corresponding to an integrated circuit that combines the functions of two or more of the units shown in FIG. 19.

The following summary provides a non-exhaustive set of illustrative aspects of the technology set forth herein.

According to a first aspect, a computing device for operation within a distributed system of computing devices is described. The computing device includes an application instance for performing a prescribed service. It also includes a bucket manager configured to: receive a set of initialization parameters from the application instance; and interact with a storage and notification (S&N) system to determine whether the computing device is to be assigned a role of a leader computing device. When operating in a leader role, the bucket manager is configured to: interact with the S&N system to determine whether there is any change in membership of the computing devices included in the distributed system; when there is a change in the membership, ensure that the change is stable; when the change is determined to be stable, update an assignment of buckets to computing devices in the distributed system such that no two computing devices are assigned a same bucket, each bucket corresponding to an allotment of work to be performed; and interact with the S&N system to record the assignment of buckets. When operating in a follower role the bucket manager is configured to: interact with the S&N system to determine whether there is a change of buckets assigned to the computing device; when there is a change of buckets, notify the application instance of the change in buckets; and interact with the S&N system to claim ownership of any bucket that has been newly assigned, and/or to relinquish ownership of any bucket that has been newly removed. The computing device includes hardware logic circuitry, the hardware logic circuitry including: (a) one or more hardware processors that perform operations by executing machine-readable instructions stored in a memory, and/or (b) one or more other hardware logic units that perform operations using a task-specific collection of logic gates.

According to a second aspect, the prescribed service corresponds to: processing one or more data entries associated with one or more respective web resources, to produce one or more processed data entries; and uploading the processed data entries to a distributed index system. A search engine uses the distributed index system to match input queries to web resources.

According to a third aspect, the S&N system provides: a data store for storing data nodes in a hierarchical data structure; and a notification component configured to notify computing devices of changes in the data nodes.

According to a fourth aspect, pertaining to the third aspect, the data store includes: a first set of data nodes that identify computing devices that are currently members of the distributed system; a second set of data nodes that identify buckets currently assigned to each computing device in the distributed system by a leader bucket manager; and a third set of data nodes that identify ownership of buckets, as asserted by the computing devices in the distributed system. The first set of data nodes is non-persistent because these data nodes will automatically be removed upon a termination of a session involving the application instance. The second set of nodes is persistent because these nodes will not be automatically removed upon a termination of a session involving the application instance. The third set of nodes is also non-persistent.

According to a fifth aspect, pertaining to the fourth aspect, the first set of data nodes also includes data associated therewith that indicates an order of the data nodes in the first set relative to each other.

According to a sixth aspect, the bucket manager also interacts with another application instance that performs another prescribed service, that other application instance being associated with another set of initialization parameters.

According to a seventh aspect, one initialization parameter specifies a number of buckets that the computing device prefers to own.

According to an eighth aspect, each bucket is associated with a bucket identifier. The assignment of a task to a bucket is determined by: creating a hash of data associated with the task; and mapping the hash to a bucket identifier associated with a particular bucket.

According to a ninth aspect, in the leader role, the bucket manager responds to a determination that a new computing device has joined by ensuring that the change is stable by: waiting, at maximum, a prescribed amount of time to determine if the new computing device is removed, the prescribed amount of time being specified by the set of initialization parameters; and identifying the new computing device as stable if the new computing device has not been removed within the prescribed amount of time.

According to a tenth aspect, in the leader role, the bucket manager responds to a determination that an existing computing device has been removed by ensuring that the change is stable by: waiting, at maximum, a prescribed amount of time to determine whether the existing computing device returns to the group of computing devices, the prescribed amount of time being specified by the set of initialization parameters; and designating the existing computing device as having left the group if the existing computing does not return within the prescribed amount of time.

According to an eleventh aspect, in the follower role, the bucket manager responds to a determination that a new bucket has been assigned to it by: interacting with the S&N system to determine whether the new bucket is currently owned by another computing device; and when the new bucket is owned by another computing device, waiting until the S&N system indicates that the other computing device has relinquished ownership of the new bucket before claiming ownership of the new bucket.

According to a twelfth aspect, a method is described for governing operation of a computing device within a distributed system of computing devices. The method includes: initializing a bucket manager based on a set of initialization parameters received from an application instance installed on the computing device, the bucket manager corresponding to a general resource that is reconfigurable by different sets of initialization parameters to work in conjunction with different application instances; and using the bucket manager to interact with a storage and notification (S&N) system to determine whether the computing device is to be assigned a role of a leader computing device. When operating in a leader role, the buck manager operates to: interact with the S&N system to determine whether there is any change in membership to a group of computing devices included in the distributed system; when there is a change in the membership, ensure that the change is stable; when the change is determined to be stable, update an assignment of buckets to computing devices in the distributed system such that no two computing devices are assigned a same bucket, each bucket corresponding to an allotment of work to be performed, assignment of a task to a bucket being determined by creating a hash of data associated with the task, and mapping the hash to a bucket identifier associated with a particular bucket; and interact with the S&N system to record the assignment of buckets. When operating in a follower role, the bucket manager operates to: interact with the S&N system to determine whether there is a change of buckets assigned to the computing device; when there is a change of buckets, notify the application instance of the change in buckets; and interact with the S&N system to claim ownership of any bucket that has been newly assigned, and/or to relinquish ownership of any bucket that has been newly removed.

According to a thirteenth aspect, pertaining to the twelfth aspect, in the leader role, the bucket manager responds to a determination that a new computing device has joined by ensuring that that the change is stable by: waiting, at maximum, a prescribed amount of time to determine if the new computing device is removed, the prescribed amount of time being specified by the set of initialization parameters; and identifying the new computing device as stable if the new computing device has not been removed within the prescribed amount of time.

According to a fourteenth aspect, pertaining to the twelfth aspect, in the leader role, the bucket manager responds to a determination that an existing computing device has been removed by ensuring that the change is stable by: waiting, at maximum, a prescribed amount of time to determine whether the existing computing device returns to the group of computing devices, the prescribed amount of time being specified by the set of initialization parameters; and designating the existing computing device as having left the group if the existing computing does not return within the prescribed amount of time.

According to a fifteenth aspect, pertaining to the twelfth aspect, in the follower role, the bucket manager responds to a determination that a new bucket has been assigned to it by: interacting with the S&N system to determine whether the new bucket is currently owned by another computing device; and when the new bucket is owned by another computing device, waiting until the S&N system indicates that the other computing device has relinquished ownership of the new bucket before claiming ownership of the new bucket.

According to a sixteenth aspect, a distributed system is described that includes: plural computing devices; and a storage and notification (S&N) system, the S&N system being configured to store data nodes in a hierarchical data structure. Each computing device includes a bucket manager and an application instance. The bucket manager of each computing device is configured to: receive a set of initialization parameters from the application instance; and interact with the S&N system to determine whether the computing device is to be assigned a role of a leader computing device. When operating in a leader role, the bucket manager is configured to: interact with the S&N system to determine whether there is any change in membership of the computing devices included in the distributed system; when there is a change in the membership, ensure that the change is stable; when the change is determined to be stable, update an assignment of buckets to computing devices in the distributed system such that no two computing devices are assigned a same bucket, each bucket corresponding to an allotment of work to be performed; and interact with the S&N system to record the assignment of buckets. When operating in a follower role, the bucket manager is configured to: interact with the S&N system to determine whether there is a change of buckets assigned to the computing device; when there is a change of buckets, notify the application instance of the change in buckets; and interact with the S&N system to claim ownership of any bucket that has been newly assigned, and/or to relinquish ownership of any bucket that has been newly removed. Each computing device includes hardware logic circuitry, the hardware logic circuitry including: (a) one or more hardware processors that perform operations by executing machine-readable instructions stored in a memory, and/or (b) one or more other hardware logic units that perform operations using a task-specific collection of logic gates.

According to a seventeenth aspect, pertaining to the sixteenth aspect, in the leader role, the bucket manager responds to a determination that a new computing device has joined by ensuring that the change is stable by: waiting, at maximum, a prescribed amount of time to determine if the new computing device is removed, the prescribed amount of time being specified by the set of initialization parameters; and identifying the new computing device as stable if the new computing device has not been removed within the prescribed amount of time.

According to an eighteenth aspect, pertaining to the sixteenth aspect, in the leader role, the bucket manager responds to a determination that an existing computing device has been removed by ensuring that the change is stable by: waiting, at maximum, a prescribed amount of time to determine whether the existing computing device returns to the group of computing devices, the prescribed amount of time being specified by the set of initialization parameters; and designating the existing computing device as having left the group if the existing computing does not return within the prescribed amount of time.

According to a nineteenth aspect, pertaining to the sixteenth aspect, the distributed system further includes a work-routing component configured to: receive a hash of data associated with a task; map the hash to a bucket identifier associated with a particular bucket; and route a task request to a computing device currently associated with the bucket.

According to a twentieth aspect, pertaining to the sixteenth aspect, the distributed system further includes a work-routing component configured to: send a task request to a particular computing device in the distributed system; and when the particular computing device does not own a bucket associated with the task request, rely on the particular computing device to route the task request to another computing device that currently owns the bucket.

A twenty-first aspect corresponds to any combination (e.g., any logically consistent permutation or subset) of the above-referenced first through twentieth aspects.

A twenty-second aspect corresponds to any method counterpart, device counterpart, system counterpart, means-plus-function counterpart, computer-readable storage medium counterpart, data structure counterpart, article of manufacture counterpart, graphical user interface presentation counterpart, etc. associated with the first through twenty-first aspects.

In closing, the functionality described herein can employ various mechanisms to ensure that any user data is handled in a manner that conforms to applicable laws, social norms, and the expectations and preferences of individual users. For example, the functionality can allow a user to expressly opt in to (and then expressly opt out of) the provisions of the functionality. The functionality can also provide suitable security mechanisms to ensure the privacy of the user data (such as data-sanitizing mechanisms, encryption mechanisms, password-protection mechanisms, etc.).

Further, the description may have set forth various concepts in the context of illustrative challenges or problems. This manner of explanation is not intended to suggest that others have appreciated and/or articulated the challenges or problems in the manner specified herein. Further, this manner of explanation is not intended to suggest that the subject matter recited in the claims is limited to solving the identified challenges or problems; that is, the subject matter in the claims may be applied in the context of challenges or problems other than those described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A particular computing device for operation within a distributed system that includes a group of plural computing devices, the particular computing device being a member of the group of computing devices, the particular computing device comprising:

hardware logic circuitry, the hardware logic circuitry including: (a) one or more hardware processors that perform operations by executing machine-readable instructions stored in a memory, and/or (b) one or more other hardware logic units that perform the operations using a collection of logic gates;

an application instance, implemented by the hardware logic circuitry, configured to perform a prescribed service;

a bucket manager, implemented by the hardware logic circuitry, configured to perform a process that governs operation of the particular computing device in a leader role and a follower role, the process involving:

receiving a set of initialization parameters from the application instance;

interacting with a storage and notification (S&N) computing system over a communication conduit, to which the group of computing devices are connected by communication links, to determine whether the computing device is to be assigned the leader role, the S&N system also being part of the distributed system, the S&N system serving as an intermediary that enables the computing devices in the group to indirectly coordinate their behavior;

when operating in the leader role:

interacting with the S&N computing system over the communication conduit to determine whether there is any change in membership in the group of computing devices included in the distributed system;

when there is a change in the membership, ensuring that the change is stable;

when the change is determined to be stable, updating an assignment of buckets to the group of computing devices in the distributed system such that no two computing devices in the group are assigned a same bucket, each bucket of the buckets that are assigned to the group corresponding to an allotment of work to be performed; and interacting with the S&N computing system over the communication conduit to record the assignment of buckets to the group of computing devices; and when operating in the follower role:

interacting with the S&N computing system over the communication conduit to determine whether there is a change of buckets assigned to the particular computing device;

when there is a change of buckets assigned to the particular computing device, notifying the application instance of the change in the buckets assigned to the particular computing device; and interacting with the S&N computing system over the communication conduit to claim ownership of any bucket that has been assigned to the particular computing device per the change of buckets, and/or to relinquish ownership of any bucket that has been removed from the particular computing device per the change of buckets.

2. The particular computing device of claim 1, wherein the prescribed service corresponds to:

processing one or more data entries associated with one or more respective web resources, to produce one or more processed data entries; and uploading the processed data entries to a distributed index system, a search engine using the distributed index system to match input queries to said one or more respective web resources.

3. The particular computing device of claim 1, wherein the S&N computing system provides:

a data store for storing data nodes in a hierarchical data structure; and a notification component, implemented by hardware logic circuitry provided by the S&N computing system, configured to notify the group of computing devices of changes in the data nodes.

4. The particular computing device of claim 3, wherein the data store includes:

a first set of data nodes that identify the group of computing devices that are currently members of the distributed system;

a second set of data nodes that identify buckets currently assigned to each computing device in the group of computing devices in the distributed system; and a third set of data nodes that identify ownership of buckets, as respectively claimed by the computing devices in the group of computing devices in the distributed system, wherein the first set of data nodes is non-persistent because these data nodes in the first set will automatically be removed upon termination of respective application instance sessions in the group of computing devices, wherein the second set of nodes is persistent because these nodes in the second set will not be automatically removed upon termination of the respective application instance sessions, and wherein the third set of nodes is also non-persistent.

5. The particular computing device of claim 4, wherein the first set of data nodes also includes data associated therewith that indicates an order of the data nodes in the first set relative to each other.

6. The particular computing device of claim 1, wherein the bucket manager also interacts with another application instance of the particular computing device that performs another prescribed service, that other application instance being associated with another set of initialization parameters.

7. The particular computing device of claim 1, wherein one initialization parameter specifies a number of buckets that the particular computing device prefers to own.

8. The particular computing device of claim 1, wherein a particular bucket, of the buckets assigned to the particular computer device, is associated with a particular bucket identifier, and wherein assignment of a particular task to the particular bucket is determined by:
creating a hash of data associated with the particular task; and
mapping the hash to the particular bucket identifier associated with the particular bucket.

9. The computing device of claim 1, wherein said ensuring that the change is stable comprises:
when the bucket manager is determined to be operating in the leader role, the bucket manager responds to a determination that another computing device has joined the group of computing devices by:
waiting, at maximum, a prescribed amount of time to determine if the other computing device is removed from the group of computing devices after joining the group of computing devices, the prescribed amount of time being specified by the set of initialization parameters; and
identifying the other computing device as stable if the other computing device has not been removed from the group within the prescribed amount of time.

10. The particular computing device of claim 1, wherein said ensuring that the change is stable comprises:
when the bucket manager is determined to be operating in the leader role, the bucket manager responds to a determination that another computing device has been removed from the group of computing devices by:
waiting, at maximum, a prescribed amount of time to determine whether the other computing device returns to the group of computing devices after having been removed from the group of computing device, the prescribed amount of time being specified by the set of initialization parameters; and
designating the other computing device as having left the group of computing devices if the existing computing does not return to the group of computing devices within the prescribed amount of time.

11. The particular computing device of claim 1, wherein, when the bucket manager is determined to be operating in the follower role, the bucket manager responds to a determination that a particular bucket has been assigned to it by:
interacting with the S&N computing system over the communication conduit to determine whether the particular bucket is currently owned by another computing device in the group of computing devices besides the particular computing device; and
when the new bucket is owned by another computing device in the group of computing devices, waiting until the S&N computing system indicates that the other computing device has relinquished ownership of the particular bucket before claiming ownership of the particular bucket.

12. A method for governing operation of a particular computing device within a distributed system that includes a group of plural computing devices, the particular computing device being a member of the group of computing devices, the method comprising:
initializing a bucket manager, implemented by hardware logic circuitry provided by the particular computing device, based on a set of initialization parameters received from an application instance installed on the particular computing device and implemented by the hardware logic circuitry provided by the particular computing device, the bucket manager corresponding to a general resource that is reconfigurable by different sets of initialization parameters to work in conjunction with different application instances;
using the bucket manager to perform a process that governs operation of the particular computing device in a leader role and a follower role, the process involving:
interacting with a storage and notification (S&N) computing system over a communication conduit, to which the group of computing devices are connected by communication links, to determine whether the particular computing device is to be assigned the leader role, the S&N system also being part of the distributed system, the S&N system serving as an intermediary that enables the computing devices in the group to indirectly coordinate their behavior;
when operating in the leader role:
interacting with the S&N computing system over the communication conduit to determine whether there is any change in membership in the group of computing devices included in the distributed system;
when there is a change in the membership, ensuring that the change is stable;
when the change is determined to be stable, updating an assignment of buckets to the group of computing devices in the distributed system such that no two computing devices in the group are assigned a same bucket, each bucket of the buckets that are assigned to the group corresponding to an allotment of work to be performed,
assignment of a particular task to a particular bucket of the buckets that are assigned to the group being determined by creating a hash of data associated with the particular task, and mapping the hash to a particular bucket identifier associated with the particular bucket; and
interacting with the S&N computing system over the communication conduit to record the assignment of buckets to the group of computing devices; and
when operating in the follower role:
interacting with the S&N computing system over the communication conduit to determine whether there is a change of buckets assigned to the particular computing device;
when there is a change of buckets assigned to the particular computing device, notifying the application instance of the change in the buckets assigned to the particular computing device; and
interacting with the S&N computing system over the communication conduit to claim ownership of any bucket that has been assigned to the particular computing device per the change in buckets, and/or to relinquish ownership of any bucket that has been removed from the particular computing device per the change in buckets,
the hardware logic circuitry including: (a) one or more hardware processors that perform operations by executing machine-readable instructions stored in a memory, and/or (b) one or more other hardware logic units that perform the operations using a collection of logic gates.

13. The method of claim 12, wherein said ensuring that the change is stable comprises:
when the bucket manager is determined to be operating in the leader role, the bucket manager responds to a determination that another computing device has joined the group of computing devices by:
waiting, at maximum, a prescribed amount of time to determine if the other computing device is removed from the group after joining the group of computing devices, the prescribed amount of time being specified by the set of initialization parameters; and
identifying the other computing device as stable if the other computing device has not been removed from the group within the prescribed amount of time.

14. The method of claim 12, wherein said ensuring that the change is stable comprises:
when the bucket manager is determined to be operating in the leader role, the bucket manager responds to a determination that another computing device has been removed from the group of computing devices by:
waiting, at maximum, a prescribed amount of time to determine whether the other computing device returns to the group of computing devices after having been removed from the group of computing devices, the prescribed amount of time being specified by the set of initialization parameters; and
designating the other computing device as having left the group of computing devices if the other computing does not return to the group of computing devices within the prescribed amount of time.

15. The method of claim 12, wherein, when the bucket manager is determined to be operating in the follower role, the bucket manager responds to a determination that another bucket has been assigned to it by:
interacting with the S&N computing system over the communication conduit to determine whether the other bucket is currently owned by another computing device in the group of computing devices besides the particular computing device; and
when the new bucket is owned by another computing device, waiting until the S&N computing system indicates that the other computing device has relinquished ownership of the other bucket before claiming ownership of the other bucket.

16. A distributed system, comprising:
a group of plural computing devices, including a particular computing device;
a storage and notification (S&N) computing system, the S&N computing system being configured to store data nodes in a hierarchical data structure, the S&N system serving as an intermediary that enables the computing devices in the group to indirectly coordinate their behavior;
a communication conduit having communication links that connect the group of computing devices to the S&N computing system;
each computing device in the group of computing devices including an instance of hardware logic circuitry that implements a respective bucket manager and a respective application instance;
a particular bucket manager of the particular computing device being configured to perform a process that governs operation of the particular computing device in a leader role and a follower role, the process involving:
receiving a set of initialization parameters from a particular application instance implemented by the particular computing device;
interacting with the S&N computing system over the communication conduit to determine whether the particular computing device is to be assigned the leader role;
when operating in the leader role:
interacting with the S&N computing system over the communication conduit to determine whether there is any change in membership in the group of computing devices included in the distributed system;
when there is a change in the membership, ensuring that the change is stable;
when the change is determined to be stable, updating an assignment of buckets to the group of computing devices in the distributed system such that no two computing devices in the group are assigned a same bucket, each bucket of the buckets that are assigned to the group corresponding to an allotment of work to be performed; and
interacting with the S&N computing system over the communication conduit to record the assignment of buckets to the group of computing devices; and
when operating in the follower role:
interacting with the S&N computing system over the communication conduit to determine whether there is a change of buckets assigned to the particular computing device;
when there is a change of buckets assigned to the particular computing device, notifying the particular application instance of the change in the buckets assigned to the particular computing device; and
interacting with the S&N computing system over the communication conduit to claim ownership of any bucket that has been assigned to the particular computing device per the change in buckets, and/or to relinquish ownership of any bucket that has been removed from the particular computing device per the change in buckets,
each instance of the hardware logic circuitry including: (a) one or more hardware processors that perform operations by executing machine-readable instructions stored in a memory, and/or (b) one or more other hardware logic units that perform the operations using a collection of logic gates.

17. The distributed system of claim 16, wherein said ensuring that the change is stable comprises:
when the particular bucket manager is determined to be operating in the leader role, the particular bucket manager responds to a determination that another computing device has joined the group of computing devices by:
waiting, at maximum, a prescribed amount of time to determine if the other computing device is removed from the group of computing devices after joining the group of computing devices, the prescribed amount of time being specified by the set of initialization parameters; and
identifying the other computing device as stable if the other computing device has not been removed from the group within the prescribed amount of time.

18. The distributed system of 16, wherein said ensuring that the change is stable comprises:
when the particular bucket manager is determined to be operating in the leader role, the particular bucket manager responds to a determination that another computing device has been removed from the group of computing devices by:
waiting, at maximum, a prescribed amount of time to determine whether the other computing device returns to the group of computing devices after having been removed from the group of computing devices, the prescribed amount of time being specified by the set of initialization parameters; and designating the other computing device as having left the group of computing devices if the other computing does not return to the group of computing devices within the prescribed amount of time.

19. The distributed system of claim 16, further including a work-routing component, implemented by another instance of hardware logic circuitry, configured to:

receive a particular hash of data associated with a particular task;

map the particular hash to a particular bucket identifier associated with a particular bucket assigned to the particular computing device; and route a task request to the particular computing device.

20. The distributed system of claim 16, further including a work-routing component, implemented by another instance of hardware logic circuitry, configured to:

send a task request to the particular computing device in the distributed system; and when the particular computing device does not own a particular bucket associated with the task request, rely on the particular computing device to route the task request to another computing device in the group of computing devices that currently owns the particular bucket.

* * * * *